(12) United States Patent
Lind et al.

(10) Patent No.: US 10,861,075 B2
(45) Date of Patent: Dec. 8, 2020

(54) APPARATUS AND METHOD FOR A CUSTOM FLAT CABLE CONFIGURATOR

(71) Applicants: Howard Lind, Valencia, CA (US); John Palahnuk, Valencia, CA (US)

(72) Inventors: Howard Lind, Valencia, CA (US); John Palahnuk, Valencia, CA (US)

( * ) Notice: Subject to any disclaimer, the term of this patent is extended or adjusted under 35 U.S.C. 154(b) by 59 days.

(21) Appl. No.: 16/155,812

(22) Filed: Oct. 9, 2018

(65) Prior Publication Data

US 2019/0043109 A1 Feb. 7, 2019

Related U.S. Application Data

(63) Continuation-in-part of application No. 14/460,950, filed on Aug. 15, 2014, now abandoned.

(51) Int. Cl.
| | |
|---|---|
| G06Q 30/00 | (2012.01) |
| G06Q 30/06 | (2012.01) |
| G06F 30/00 | (2020.01) |
| G06F 113/16 | (2020.01) |

(52) U.S. Cl.
CPC ......... *G06Q 30/0621* (2013.01); *G06F 30/00* (2020.01); *G06Q 30/06* (2013.01); *G06Q 30/0601* (2013.01); *G06Q 30/0633* (2013.01); *G06Q 30/0641* (2013.01); *G06Q 30/0643* (2013.01); *G06F 2113/16* (2020.01)

(58) Field of Classification Search
CPC ................. G06Q 30/0601–0645; G06Q 30/08
USPC ................................................ 705/26.1–27.2
See application file for complete search history.

(56) References Cited

U.S. PATENT DOCUMENTS

2017/0140450 A1* 5/2017 Ashby ................ G06Q 30/0621

OTHER PUBLICATIONS

Igus, "chainflex custom cable configurator", published Dec. 6, 2012, accessed at https://www.youtube.com/watch?v=COyBajPUql on Jul. 13, 2020. (Year: 2012).*

* cited by examiner

*Primary Examiner* — Jeffrey A. Smith
*Assistant Examiner* — Lindsey B Smith
(74) *Attorney, Agent, or Firm* — Edmond DeFrank

(57) ABSTRACT

The embodiments disclose an apparatus including a custom flat cable configurator interactive Internet system to allow a user to design a custom flat cable using cable elements, at least one drag and drop flat cable element, wherein a user selects at least one cable element, a digital code program to automatically create a concurrent cable assembly drawing, a listing of selected cable elements and a cable price from user drag and drop selected cable elements, and a user interface wherein the user submits a final custom flat cable configurator program cable assembly and the user automatically is sent an email with a final cable assembly drawing, a no-obligation price, a final listing of selected cable elements and final custom flat cable purchase instructions.

20 Claims, 33 Drawing Sheets

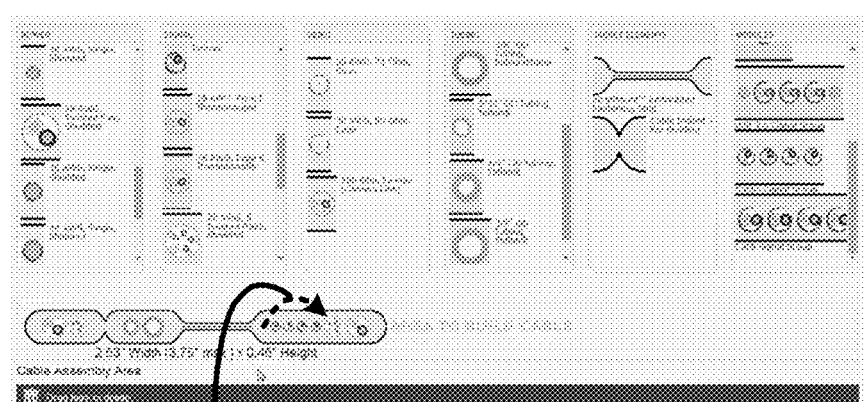
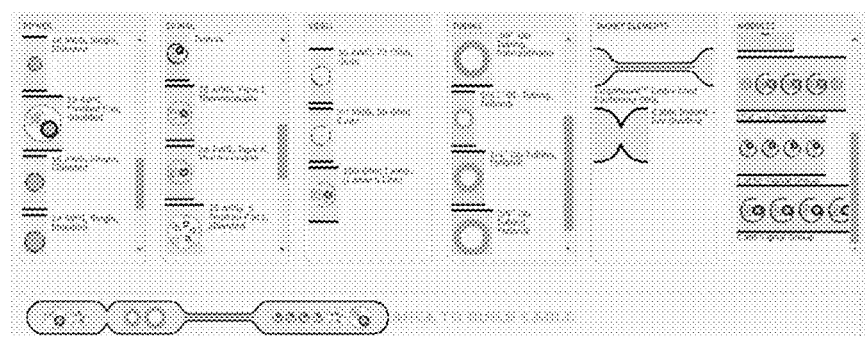
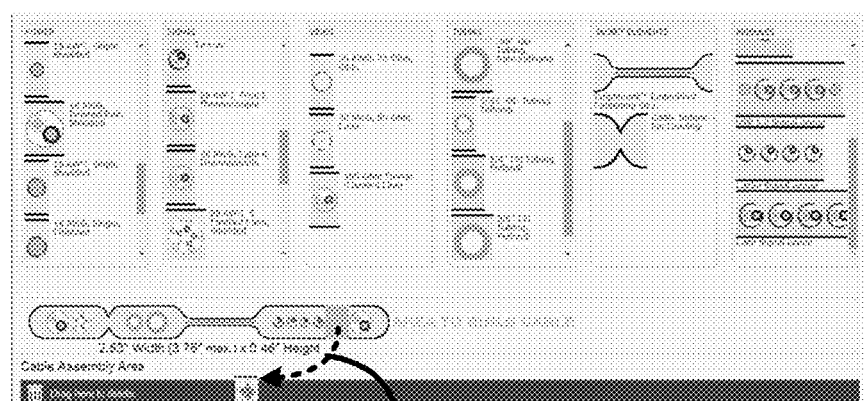
FIG. 12

APPARATUS AND METHOD FOR A CUSTOM FLAT CABLE CONFIGURATOR

CROSS-REFERENCE TO RELATED APPLICATIONS

This patent application is a Continuation-In-Part and claims priority to United States patent application entitled: "CUSTOM FLAT CABLE CONFIGURATOR", U.S. Ser. No. 14/460,950 filed on Aug. 15, 2014, the U.S. patent application being incorporated herein by reference.

BACKGROUND

Multiple cable element groupings may take a great deal of time and effort to design. Cable users who order cable groupings and most cable manufacturers go back and forth to arrive at an acceptable design during which the cost of manufacturing each design must be calculated.

BRIEF DESCRIPTION OF THE DRAWINGS

FIG. 12 shows for illustrative purposes only an example of deleting cable elements of one embodiment.

DETAILED DESCRIPTION OF THE INVENTION

In a following description, reference is made to the accompanying drawings, which form a part hereof, and in which is shown by way of illustration a specific example in which the invention may be practiced. It is to be understood that other embodiments may be utilized and structural changes may be made without departing from the scope of the present invention.

General Overview:

It should be noted that the descriptions that follow, for example, in terms of a custom flat cable configurator is described for illustrative purposes and the underlying system can apply to any number and multiple types of cables. In one embodiment of the present invention, the custom flat cable configurator can be configured using multiple cable element groups. The custom flat cable configurator can be configured to include computer programmable code and can be configured to include a digital mobile device programmable application using the present invention.

Figure 1:
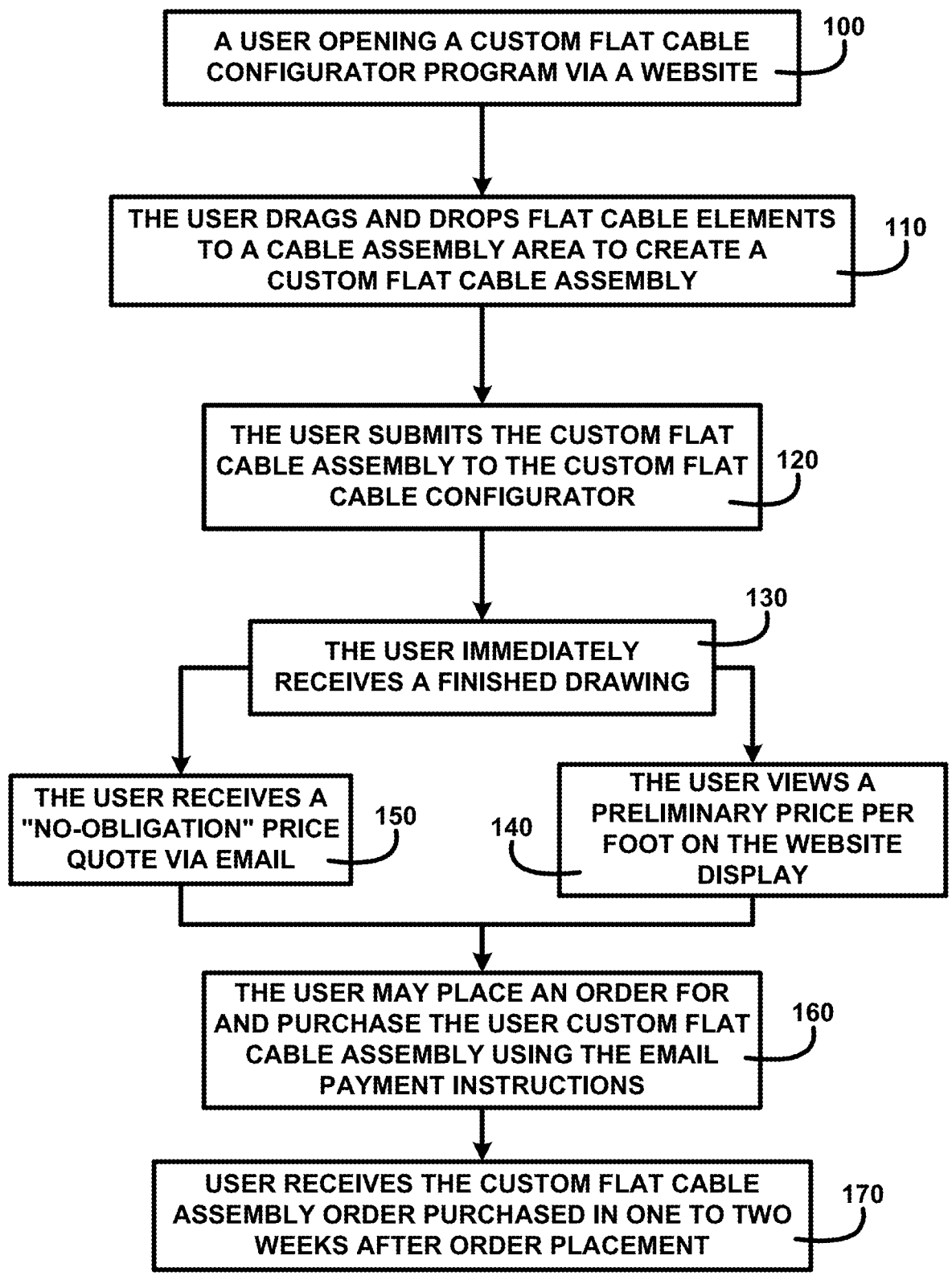
FIG. 1 shows a block diagram of an overview of a custom flat cable configurator of one embodiment.

FIG. 1 shows a block diagram of an overview of a custom flat cable configurator of one embodiment. FIG. 1 shows a user opening a custom flat cable configurator program via a website 100. The user drags and drops flat cable elements to a cable assembly area to create a custom flat cable assembly 110. The user submits the custom flat cable assembly to the custom flat cable configurator 120. After submittal the user immediately receives a finished drawing 130 and the user receives a "no-obligation" price quote via email 140. The user views a preliminary price per foot on the website display 150. The user may place an order for and purchase the user custom flat cable assembly using the email payment instructions 160. After placing an order the user receives the custom flat cable assembly order purchased in one to two weeks after order placement 170.

DETAILED DESCRIPTION

Figure 2:
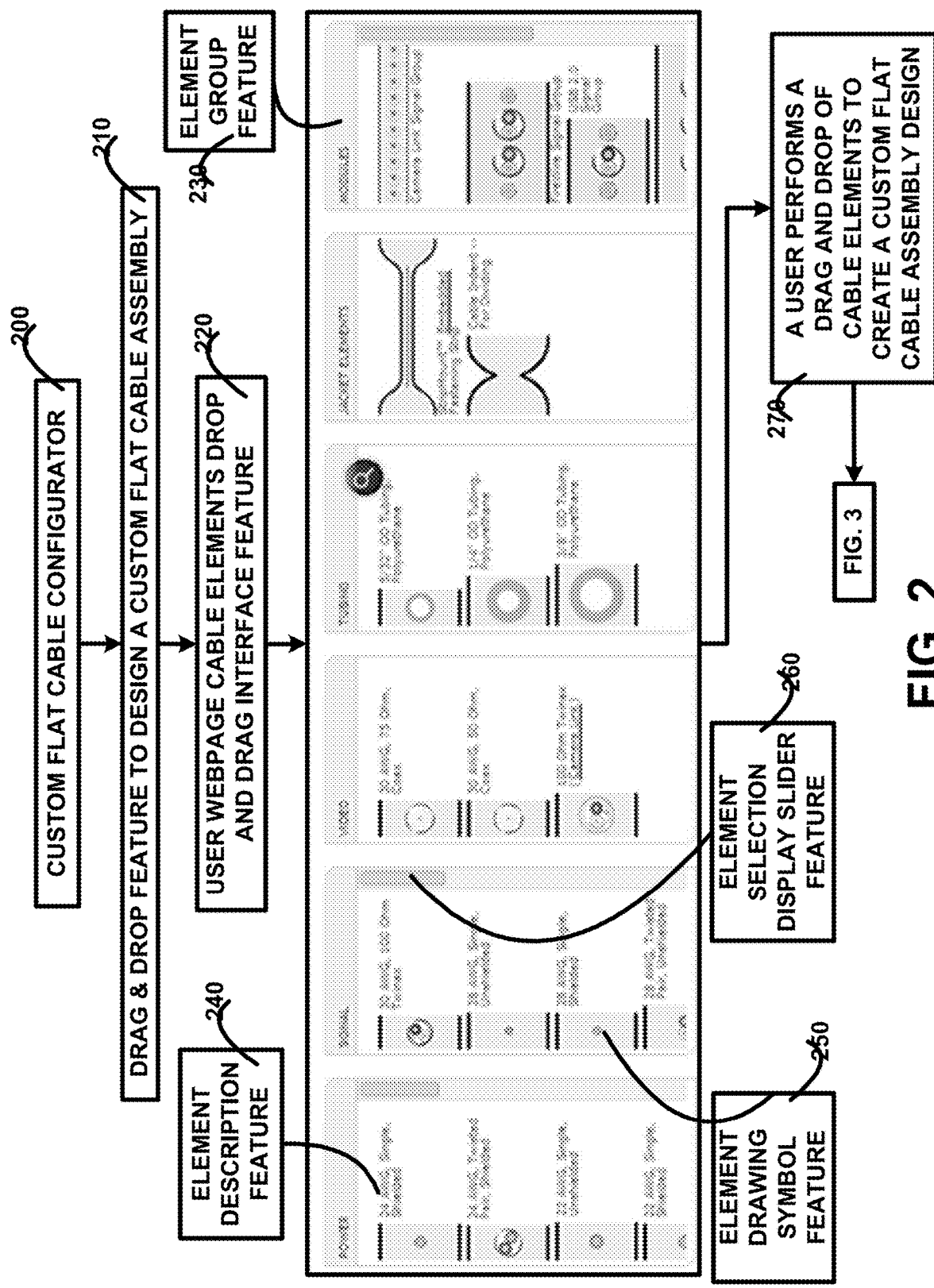
FIG. 2 shows a block diagram of an overview flow chart of a user drag and drop webpage interface of one embodiment.

FIG. 2 shows a block diagram of an overview flow chart of a user drag and drop webpage interface of one embodiment. FIG. 2 shows the custom flat cable configurator 200 including a drag & drop feature to design a custom flat cable assembly 210. A user webpage cable elements drop and drag interface feature 220 used by the user where a user performs a drag and drop of cable elements to create a custom flat cable assembly design 230. The user may select from an element group feature 240 multiple cable elements from an element description feature 250 and an element drawing symbol feature 260. The selections are displayed using an element selection display slider feature 270. The features and procedures continue in FIG. 3 of one embodiment.

Figure 3:
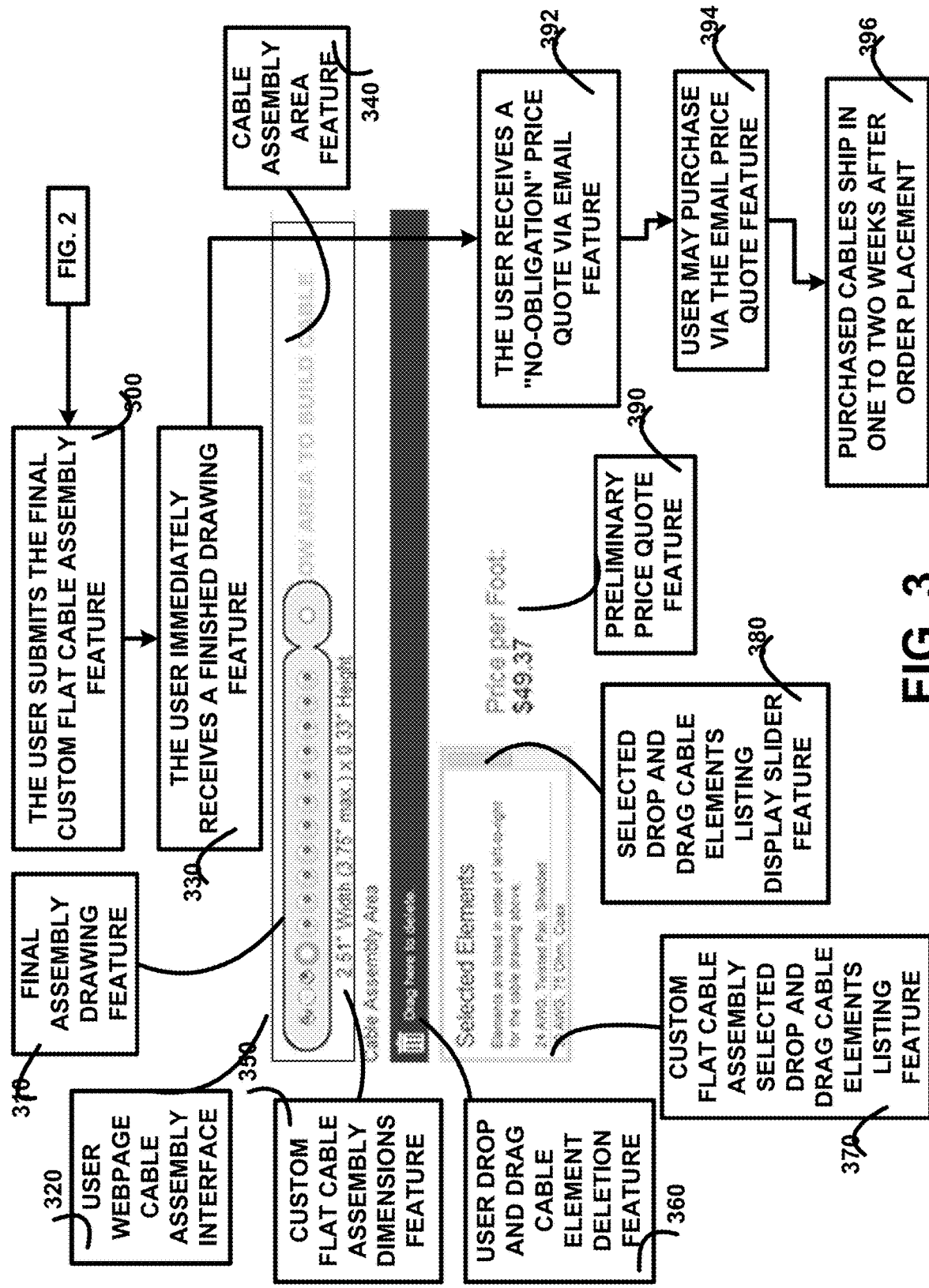
FIG. 3 shows a block diagram of an overview flow chart of cable assembly area feature of one embodiment.

Cable Assembly Area Feature:

FIG. 3 shows a block diagram of an overview flow chart of cable assembly area feature of one embodiment. FIG. 3 shows where the user submits the final custom flat cable assembly feature 300. Upon submittal the user immediately receives a finished drawing feature 330 and the user receives a "no-obligation" price quote via email feature 392. The user may purchase via the email price quote feature 394 the final custom designed flat cable assembly. The user purchased cables ship in one to two weeks after order placement 396 by the user. A final assembly drawing feature 310 is shown in a user webpage cable assembly interface 320 in a cable assembly area feature 340 and that automatically updates as the user make selections. The webpage shows a custom flat cable assembly dimensions feature 350 to inform the user of the size of the final custom flat cable assembly and that automatically updates as the user make selections. The user may change previously selected elements using a user drop and drag cable element deletion feature 360. During the selection process a user may view a custom flat cable assembly selected drop and drag cable elements listing feature 370 to check which elements they have selected. The cable elements listing feature includes a selected drop and drag cable elements listing display slider feature 380 allowing the user to scroll up and down the listing. The webpage displays a preliminary price quote feature 390 that automatically updates as the user make selections.

Figure 4:
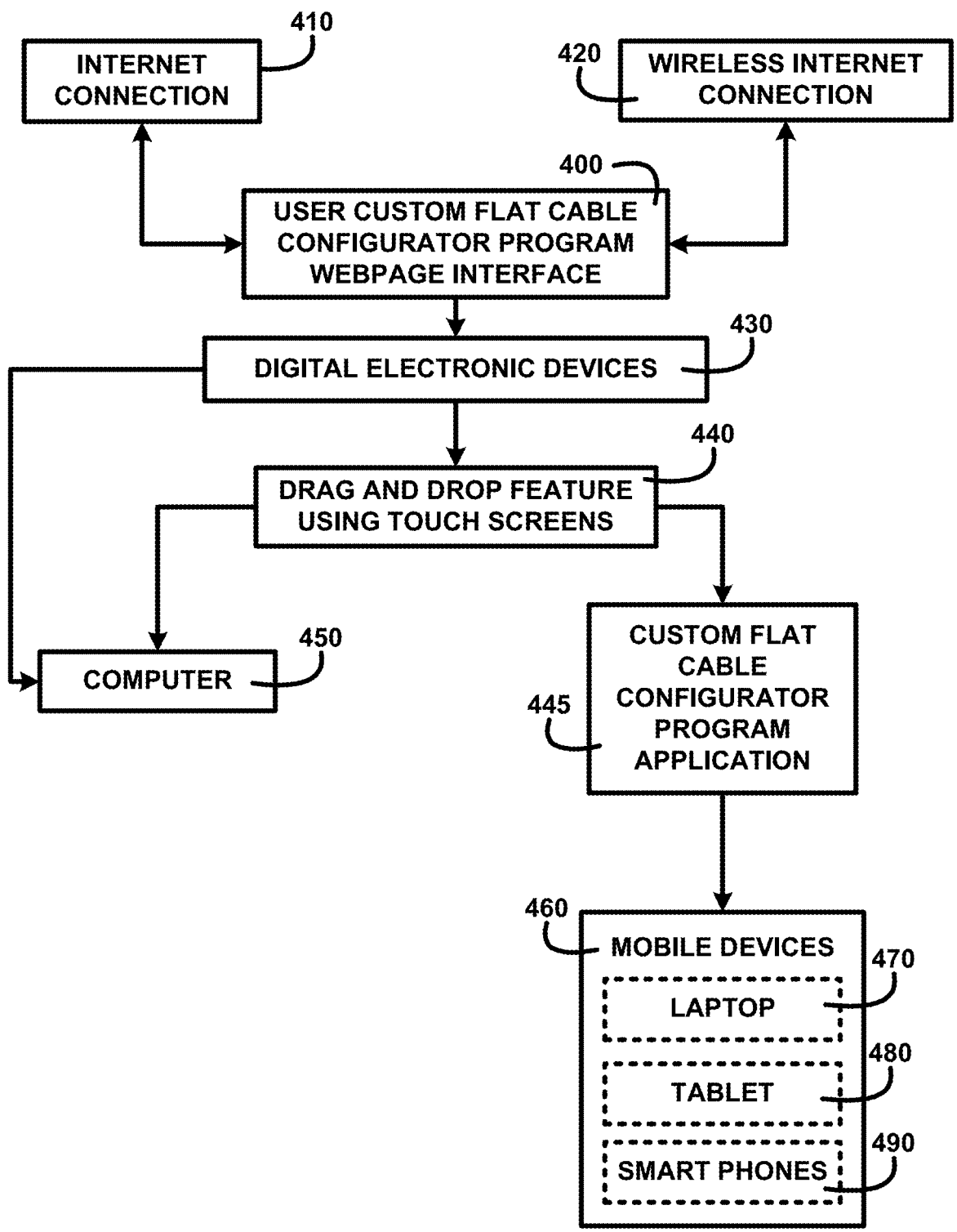
FIG. 4 shows for illustrative purposes only an example of custom flat cable configurator program application of one embodiment.

Custom Flat Cable Configurator Program Application:

FIG. 4 shows for illustrative purposes only an example of custom flat cable configurator program application of one embodiment. FIG. 4 shows a user custom flat cable configurator program webpage interface 400. The custom flat cable configurator program webpage may be accessed using an internet connection 410 and a wireless internet connection 420 using digital electronic devices 430. The custom flat cable configurator program webpage interface includes a drag and drop feature using touch screens 440. A user may access the custom flat cable configurator program webpage using digital electronic devices 430 including a computer 450 and mobile devices 460. A custom flat cable configurator program application 445 may be used with mobile devices 460 including a laptop 470, a tablet 480 and smart phones 490 of one embodiment.

Figure 5:
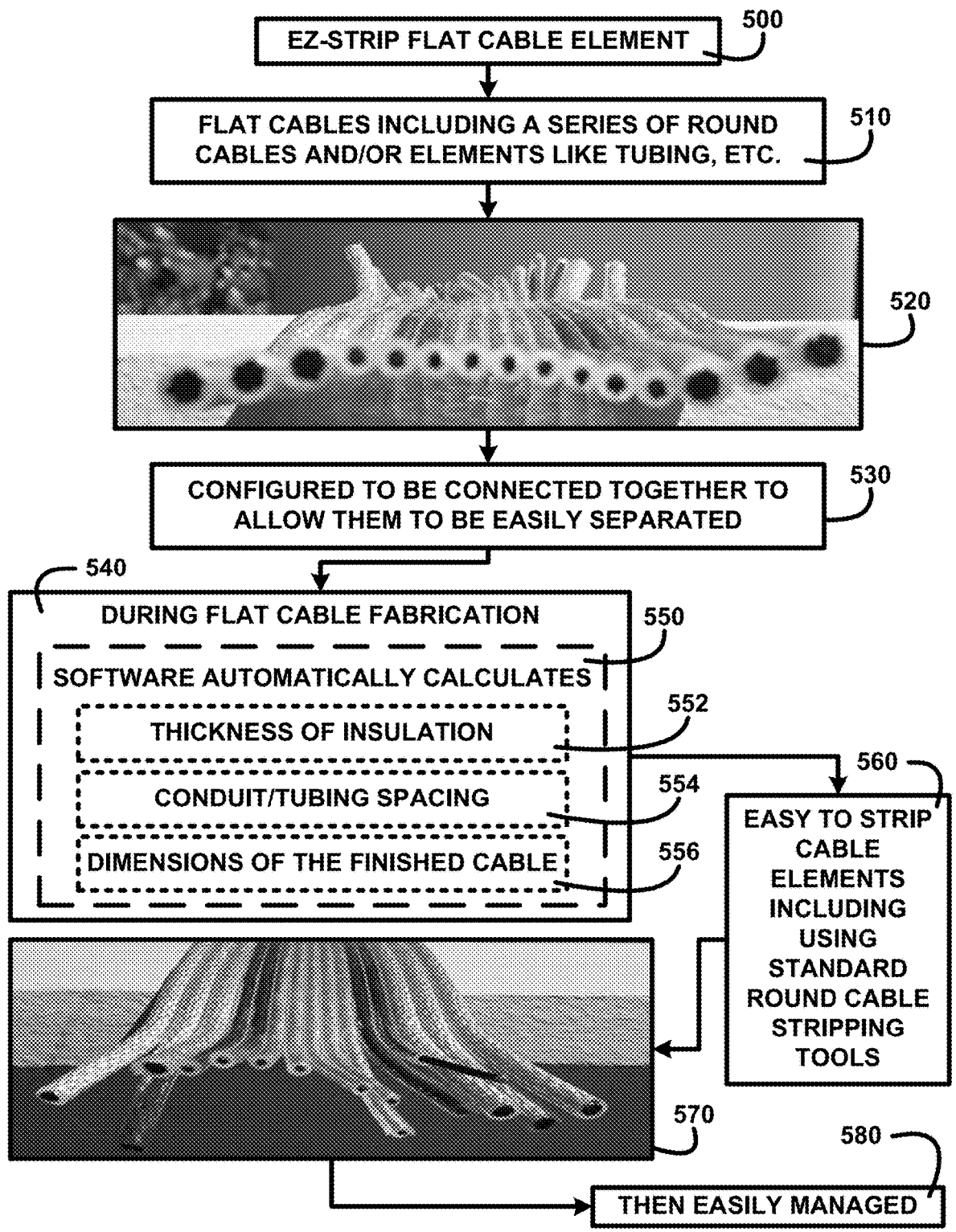
FIG. 5 shows for illustrative purposes only an example of EZ-strip flat cable element of one embodiment.

EZ-Strip Flat Cable Element:

FIG. 5 shows for illustrative purposes only an example of EZ-strip flat cable element of one embodiment. FIG. 5 shows an EZ-strip flat cable element 500 that is incorporates into flat cables including a series of round cables and/or elements like tubing, etc. 510. An EZ-strip flat cable assembly 520 may be configured to be connected together to allow them to be easily separated 530. During flat cable fabrication 540, software automatically calculates 550 a thickness of insulation 552, conduit/tubing spacing 554 and dimensions of the finished cable 556. The EZ-strip flat cable element creates easy to strip cable elements including using standard round cable stripping tools 560. The EZ-strip flat cable assembly with separated cable elements 570 is then easily managed 580 of one embodiment.

Figure 6:
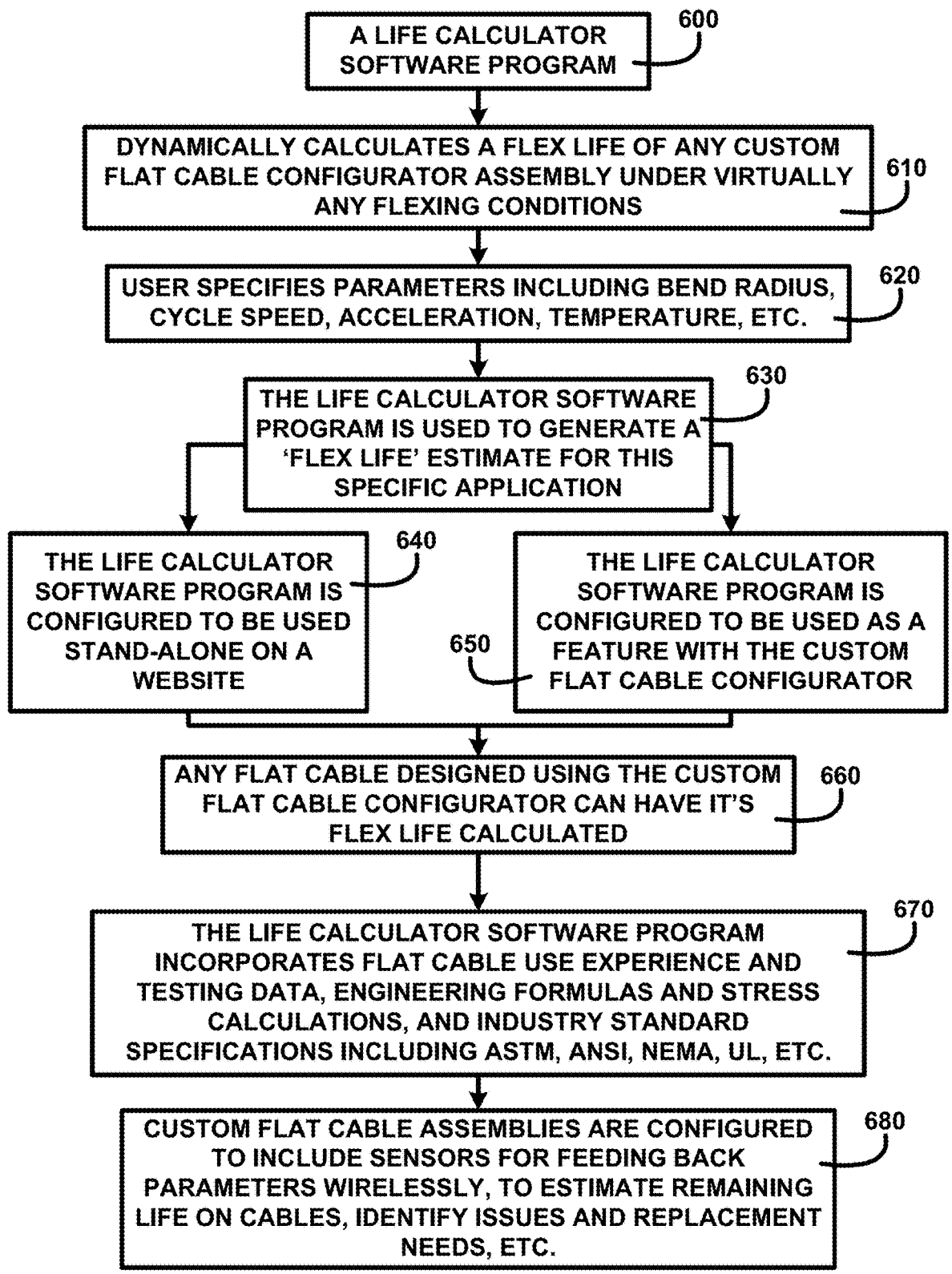
FIG. 6 shows for illustrative purposes only an example of a life calculator software program of one embodiment.

Life Calculator Software Program:

FIG. 6 shows for illustrative purposes only an example of a life calculator software program of one embodiment. FIG. 6 shows a life calculator software program 600 dynamically calculates a flex life of any custom flat cable configurator assembly under virtually any flexing conditions 610. The user specifies parameters including bend radius, cycle speed, acceleration, temperature, etc. 620. The life calculator software program is used to generate a 'flex life' estimate for this specific application 630. The life calculator software program is configured to be used stand-alone on a website 640. The life calculator software program is configured to be used as a feature with the custom flat cable configurator 650 where any flat cable designed using the custom flat cable configurator can have it's flex life calculated 660. The life calculator software program incorporates flat cable use experience and testing data, engineering formulas and stress calculations, and industry standard specifications including ASTM, ANSI, NEMA, UL, etc. 670. Custom flat cable assemblies are configured to include sensors for feeding back parameters wirelessly, to estimate remaining life on cables, identify issues and replacement needs, etc. 680

Figure 7:
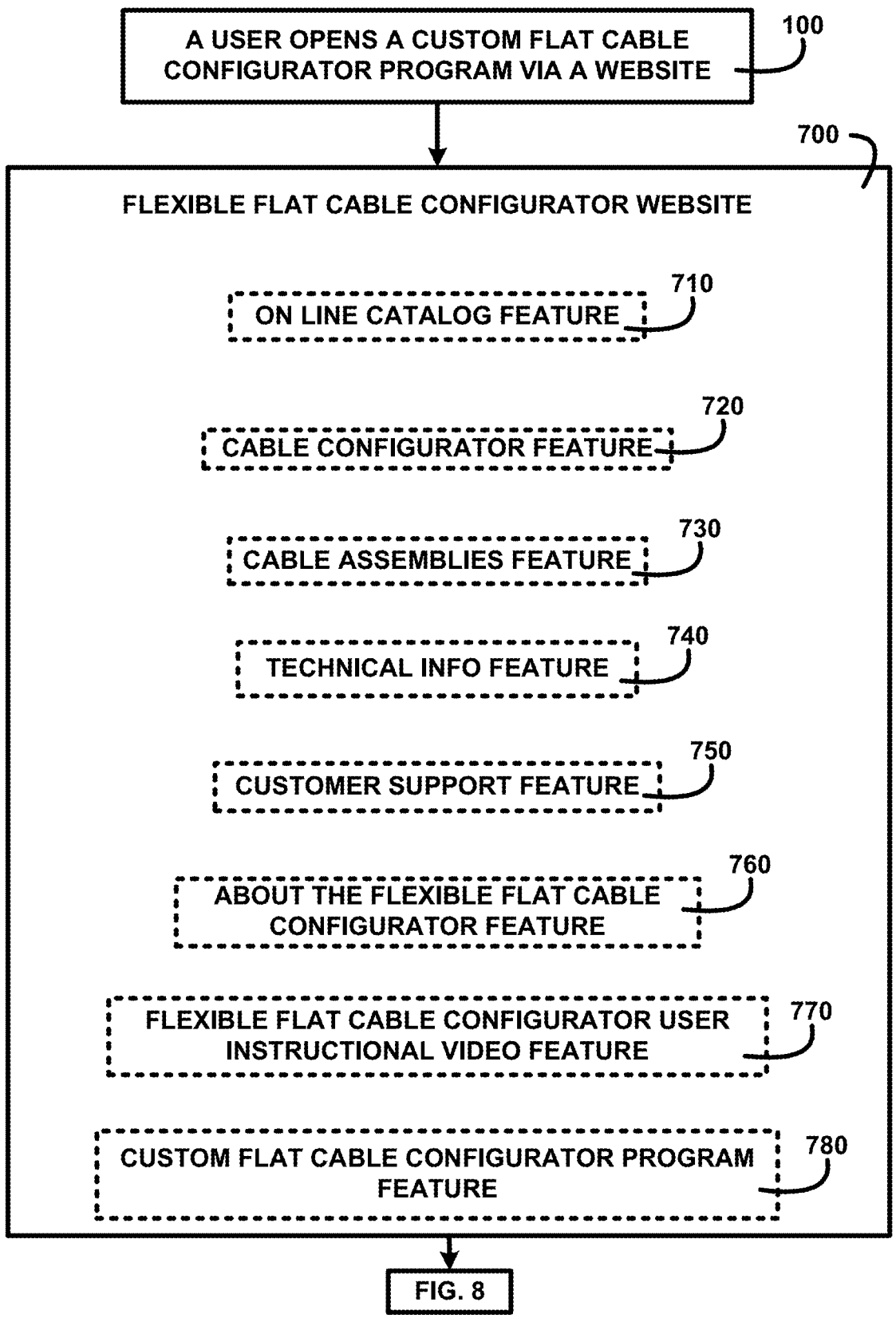
FIG. 7 shows for illustrative purposes only an example of flexible flat cable configurator website features of one embodiment.

Flexible Flat Cable Configurator Website Features:

FIG. 7 shows for illustrative purposes only an example of flexible flat cable configurator website features of one embodiment. FIG. 7 shows a user opening a custom flat cable configurator program via a website 100. The flexible flat cable configurator website 700 includes an on line catalog feature 710, a cable configurator feature 720, a cable assemblies feature 730, a technical info feature 740, a customer support feature 750, an about the flexible flat cable configurator feature 760, a flexible flat cable configurator user instructional video feature 770, and a custom flat cable configurator program feature 780 of one embodiment. The flexible flat cable configurator website features user interface interactive procedures are described in FIG. 8.

Figure 8:
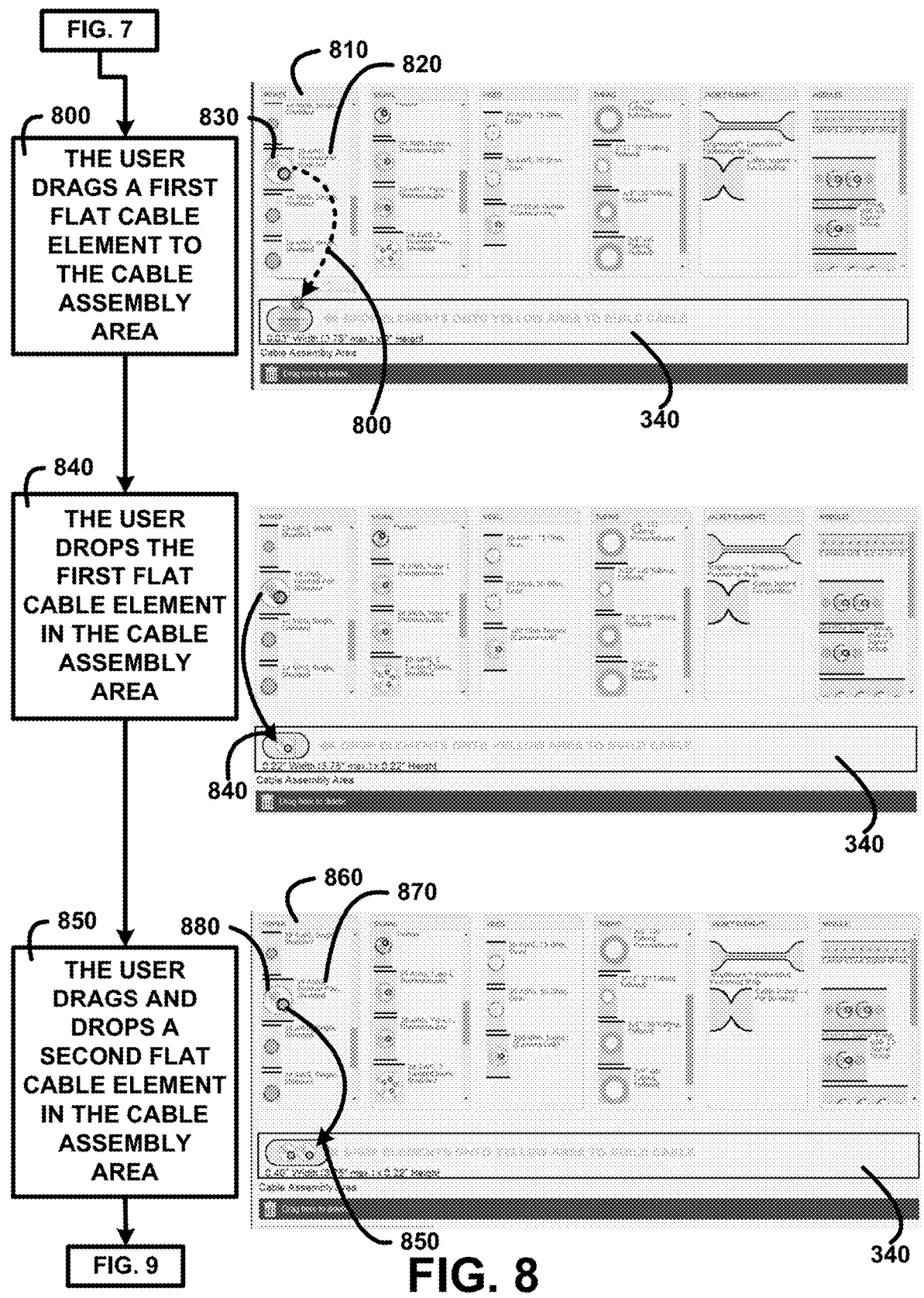
FIG. 8 shows for illustrative purposes only an example of first drag and drop function of one embodiment.

First Drag and Drop Function:

FIG. 8 shows for illustrative purposes only an example of first drag and drop function of one embodiment. FIG. 8 shows a continuation from FIG. 7 including a screen shot of the cable configurator webpage where the user drags a first flat cable element to the cable assembly area 800. The user selects from a first element group 810 a first element description 820 and a first element drawing symbol 830. The user drops the first flat cable element in the cable assembly area 840 as shown in the cable assembly area feature 340. The user drags and drops a second flat cable element in the cable assembly area 850 from a second element group 860 where the user selects a second element description 870 and a second element drawing symbol 880 of one embodiment.

Figure 9:
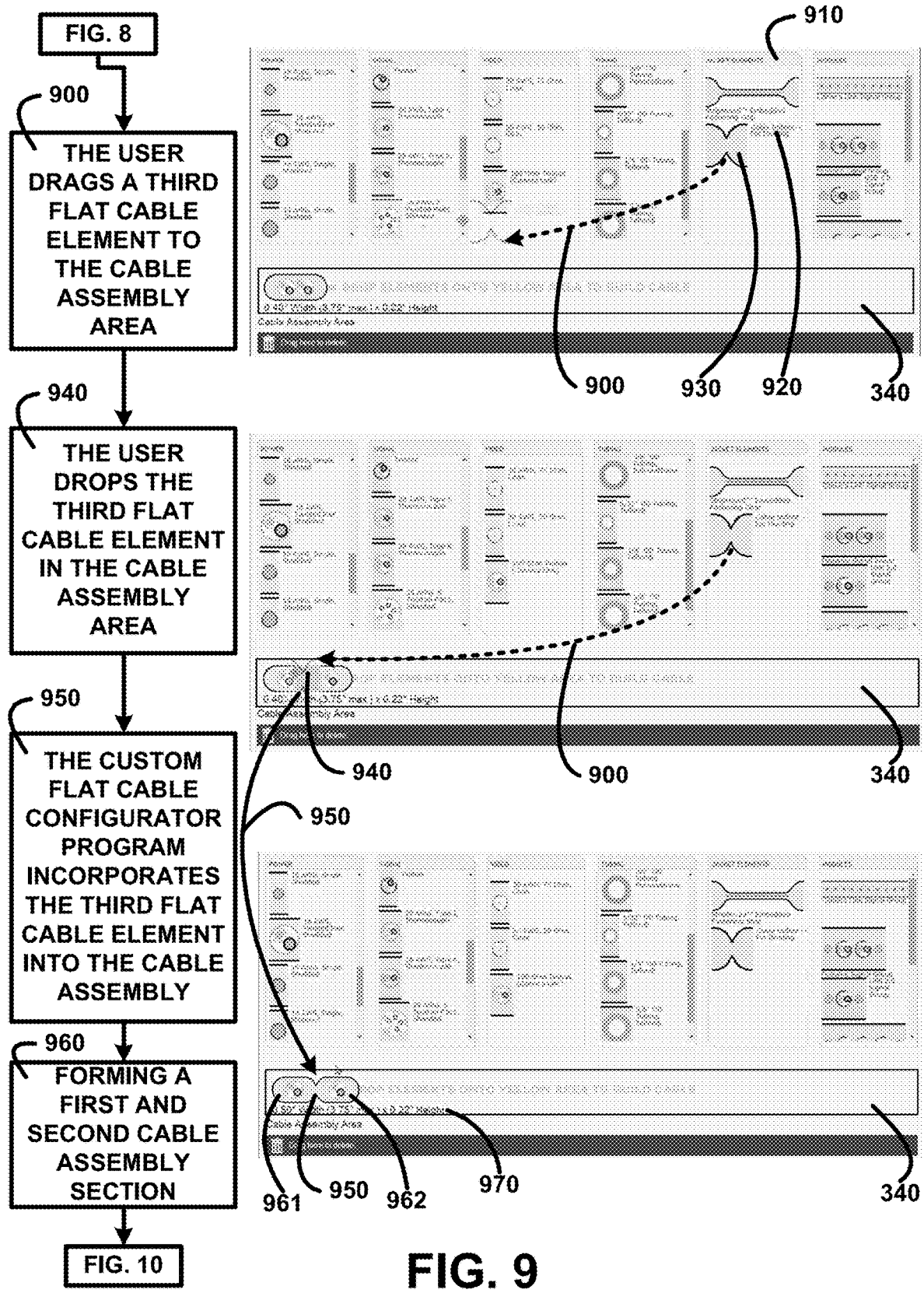
FIG. 9 shows for illustrative purposes only an example of incorporating cable elements of one embodiment.

Incorporating Cable Elements:

FIG. 9 shows for illustrative purposes only an example of incorporating cable elements of one embodiment. FIG. 9 shows a continuation from FIG. 8 where the user drags a third flat cable element to the cable assembly area 900 from a third element group 910. The user drops the third flat cable element in the cable assembly area 940 where a third element description 920 is added to the listing and a third element drawing symbol 930 is added using the cable assembly area feature 340 as seen in the drawing. The custom flat cable configurator program incorporates the third flat cable element into the cable assembly 950 forming a first and second cable assembly section 960. A first cable section 961 and a second cable section 962 are shown in the drawing. The cable configurator program automatically updates the custom flat cable assembly dimensions feature 970 of one embodiment. The processing continues in FIG. 10.

Figure 10:
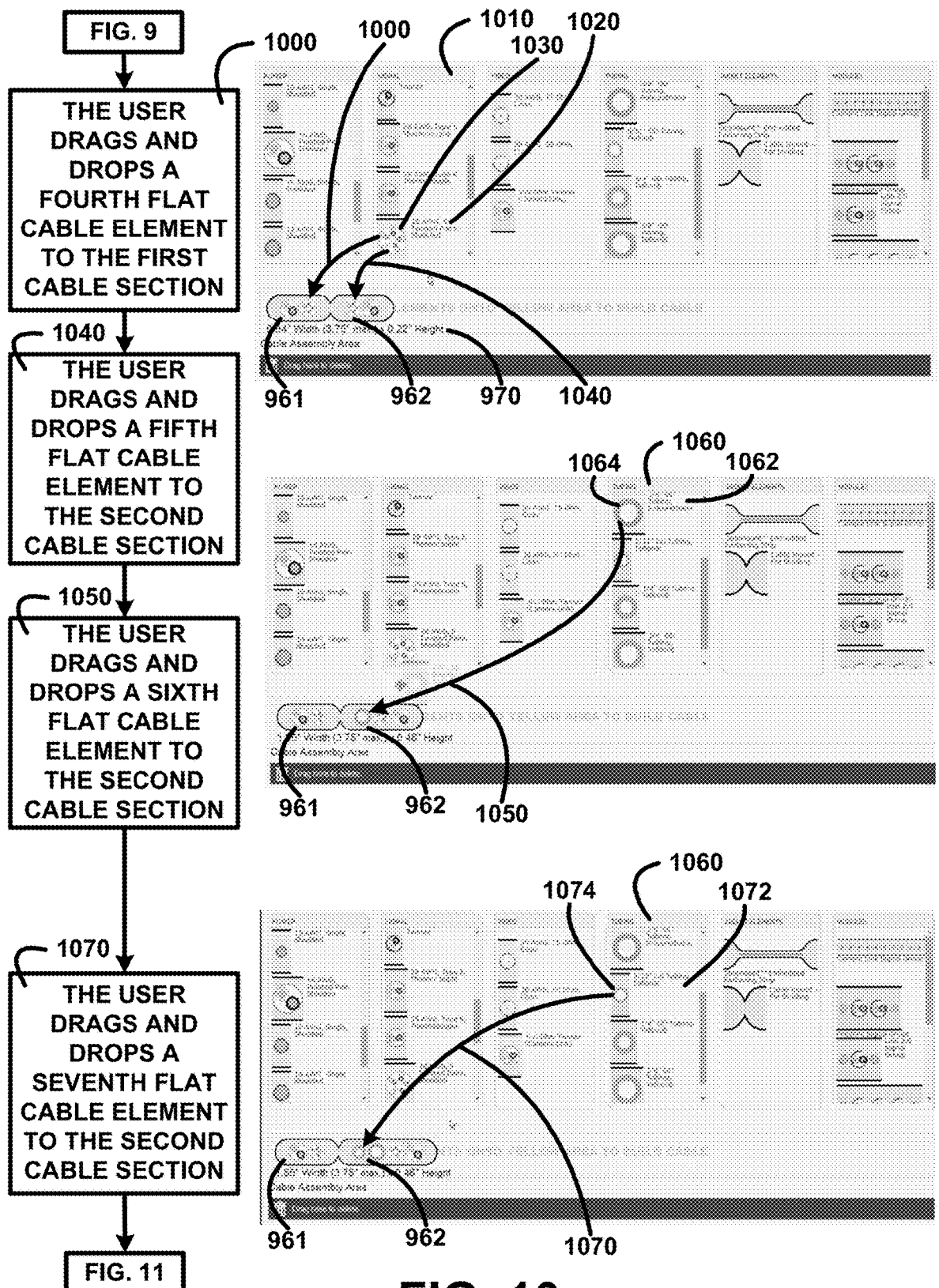
FIG. 10 shows for illustrative purposes only an example of automatic cable dimensioning function of one embodiment.

Automatic Cable Dimensioning Function:

FIG. 10 shows for illustrative purposes only an example of automatic cable dimensioning function of one embodiment. FIG. 10 shows a continuation from FIG. 9 where the user drags and drops a fourth flat cable element to the first cable section 1000 as seen in the webpage display of a first cable section 961 and a second cable section 962. The user drags and drops a fifth flat cable element to the second cable section 1040. The cable configurator program automatically custom flat cable assembly dimensions feature 970. The user drags and drops a sixth flat cable element to the second cable section 1050 by selecting from a sixth element group 1060 and selects a sixth element description 1062 and a sixth element drawing symbol 1064. The user drags and drops a seventh flat cable element to the second cable section 1070 from a sixth element group 1060 and selects a seventh element description 1072 and a seventh element drawing symbol 1074 of one embodiment.

Figure 11:
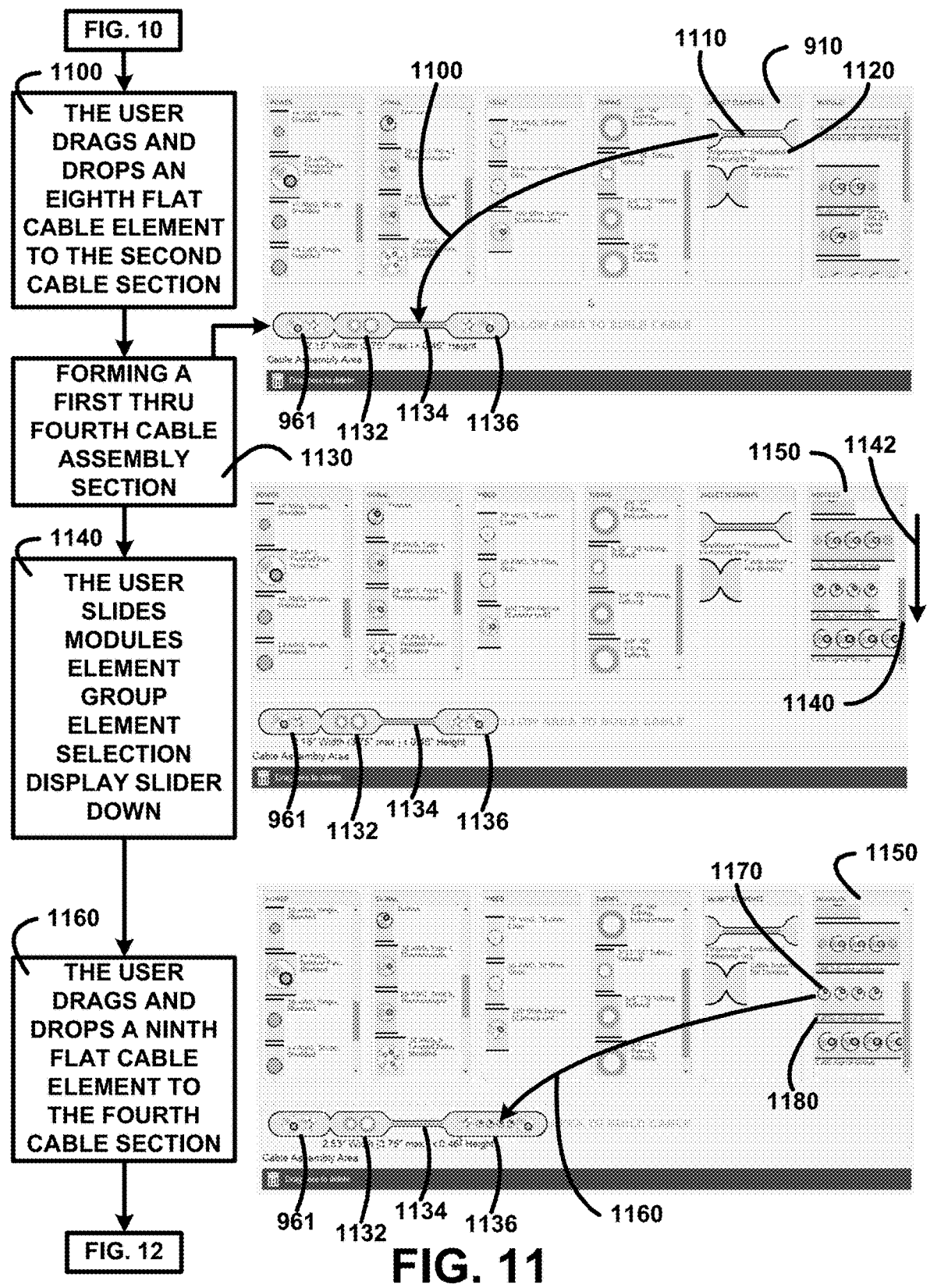
FIG. 11 shows for illustrative purposes only an example of sectionalizing cable elements of one embodiment.

Sectionalizing Cable Elements:

FIG. 11 shows for illustrative purposes only an example of sectionalizing cable elements of one embodiment. FIG. 11 shows a continuation from FIG. 10 where the user drags and drops an eighth flat cable element to the second cable section 1100. The user selects from a third element group 910 and selects a eighth element description 1120 and an eighth element drawing symbol 1110. The eighth flat cable element incorporation forms a first cable section 961, a second cable section 1132, a third cable section 1134, and a fourth cable section 1136. The user slides modules element group element selection display slider down 1140 of a seventh element selection display slider 1142 to review the cable elements in a seventh element group 1150. The user drags and drops a ninth flat cable element to the fourth cable section 1160. A ninth element description 1180 is added to the selected cable element listing and a ninth element drawing symbol 1170 is incorporated into the drawing of one embodiment. The process continues in FIG. 12.

Deleting Cable Elements:

FIG. 12 shows for illustrative purposes only an example of deleting cable elements of one embodiment. FIG. 12 shows a continuation from FIG. 11 where the user drags and drops the fourth flat cable element to opposite side of the ninth the flat cable element 1200. The user slides the selected drop and drag cable elements listing display slider down 1210 and selects the fourth flat cable element 1220 from the selected drop and drag cable elements listing 370. Identifying the fourth flat cable element using the selected drop and drag cable elements listing display slider 380 the user drags and drops fourth flat cable element to the cable element deletion feature 1230. A drag here to delete feature 1240 removes the fourth flat cable element from the listing and drawing of one embodiment. The process continues in FIG. 13.

Figure 13:
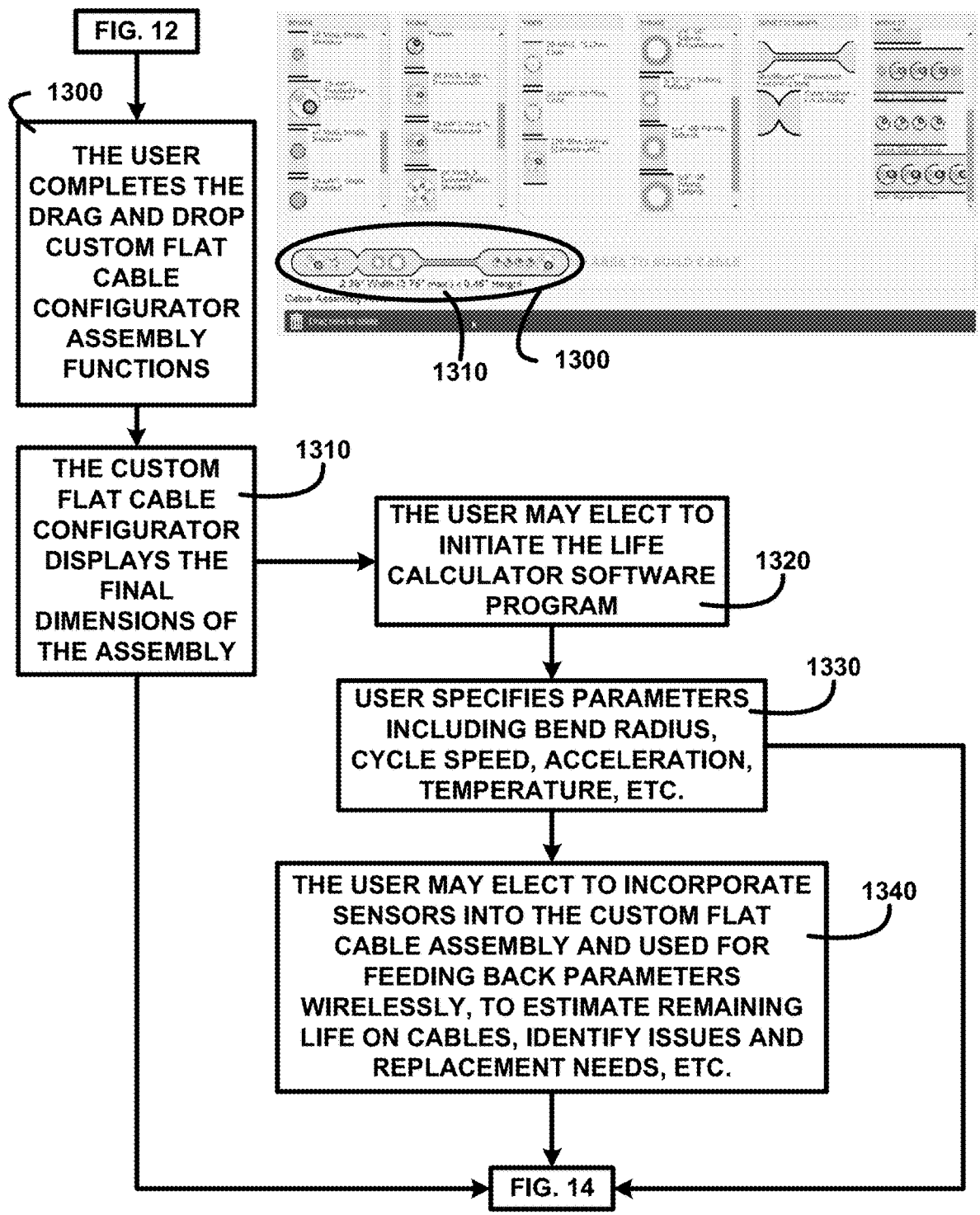
FIG. 13 shows for illustrative purposes only an example of a user completing a cable assembly design of one embodiment.

A User Completing a Cable Assembly Design:

FIG. 13 shows for illustrative purposes only an example of a user completing a cable assembly design of one embodiment. A continuation from FIG. 12 is shown in FIG. 13 showing where the user completes the drag and drop custom flat cable configurator assembly functions 1300. The custom flat cable configurator displays the final dimensions of the assembly 1310. The user may elect to initiate the life calculator software program 1320 where the user specifies parameters including bend radius, cycle speed, acceleration, temperature, etc. 1330. The software will generate a 'flex life' estimate for this specific application. The user may elect to incorporate sensors into the custom flat cable assembly and used for feeding back parameters wirelessly, to estimate remaining life on cables, identify issues and replacement needs, etc. 1340 of one embodiment. The process continues in FIG. 14.

Figure 14:
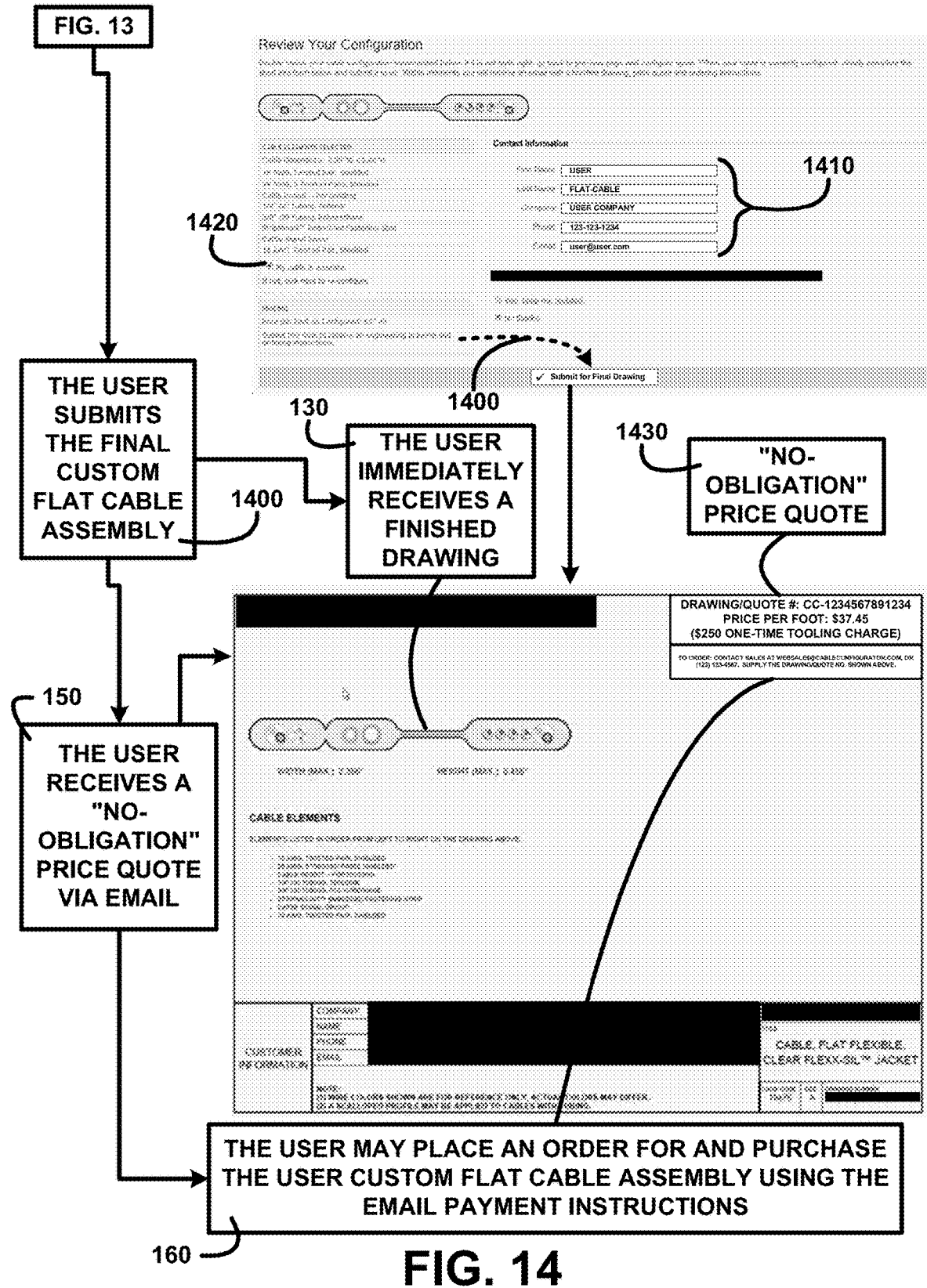
FIG. 14 shows for illustrative purposes only an example of a user final cable assembly submittal of one embodiment.

A User Final Cable Assembly Submittal:

FIG. 14 shows for illustrative purposes only an example of a user final cable assembly submittal of one embodiment. FIG. 14 continues from FIG. 13 and shows the user submits the final custom flat cable assembly 1400. The user enters contact information 1410. The user may view the final custom flat cable assembly selected elements listing 1420. The user immediately receives a finished drawing 130. The user receives a "no-obligation" price quote via email 150 and a no-obligation price quote 1430. The user may place an order for and purchase the user custom flat cable assembly using the email payment instructions 160 of one embodiment.

Figure 15:
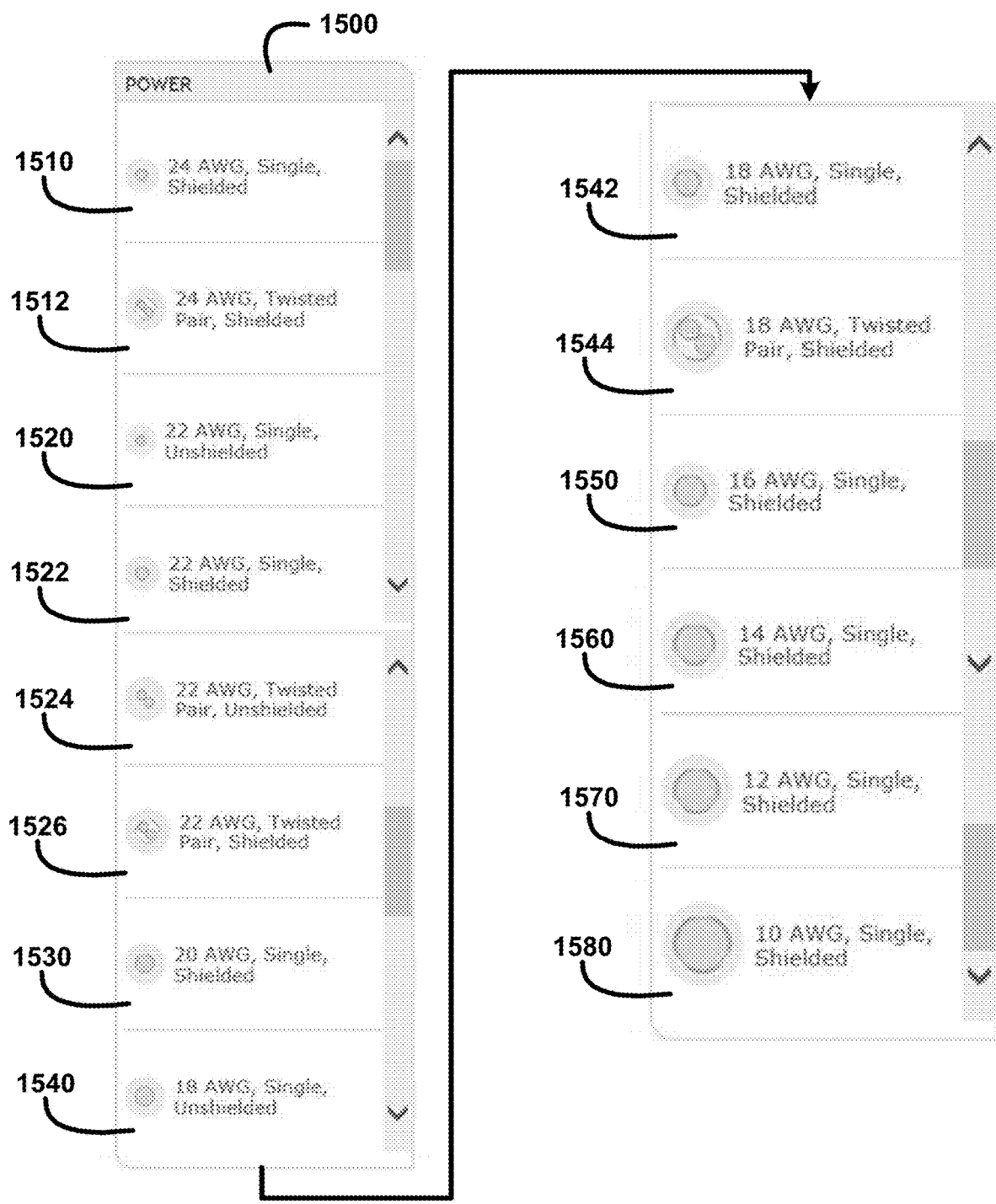
FIG. 15 shows for illustrative purposes only an example of a power cable element group of one embodiment.

A Power Cable Element Group:

FIG. 15 shows for illustrative purposes only an example of a power cable element group of one embodiment. FIG. 15 shows an example of POWER 1500 a cable element group. POWER 1500 cable element group includes 24 AWG, Single, Shielded 1510, 24 AWG, Twisted Pair, Shielded 1512, 22 AWG, Single, Unshielded 1520, 22 AWG, Single, Shielded 1522, 22 AWG, Twisted Pair, Unshielded 1524, 22 AWG, Twisted Pair, Shielded 1526, 20 AWG, Single, Shielded 1530, 18 AWG, Single, Unshielded 1540, 18 AWG, Single, Shielded 1542, 18 AWG, Twisted Pair, Shielded 1544, 16 AWG, Single, Shielded 1550, 14 AWG, Single, Shielded 1560, 12 AWG, Single, Shielded 1570, and 10 AWG, Single, Shielded 1580 of one embodiment.

Figure 16:
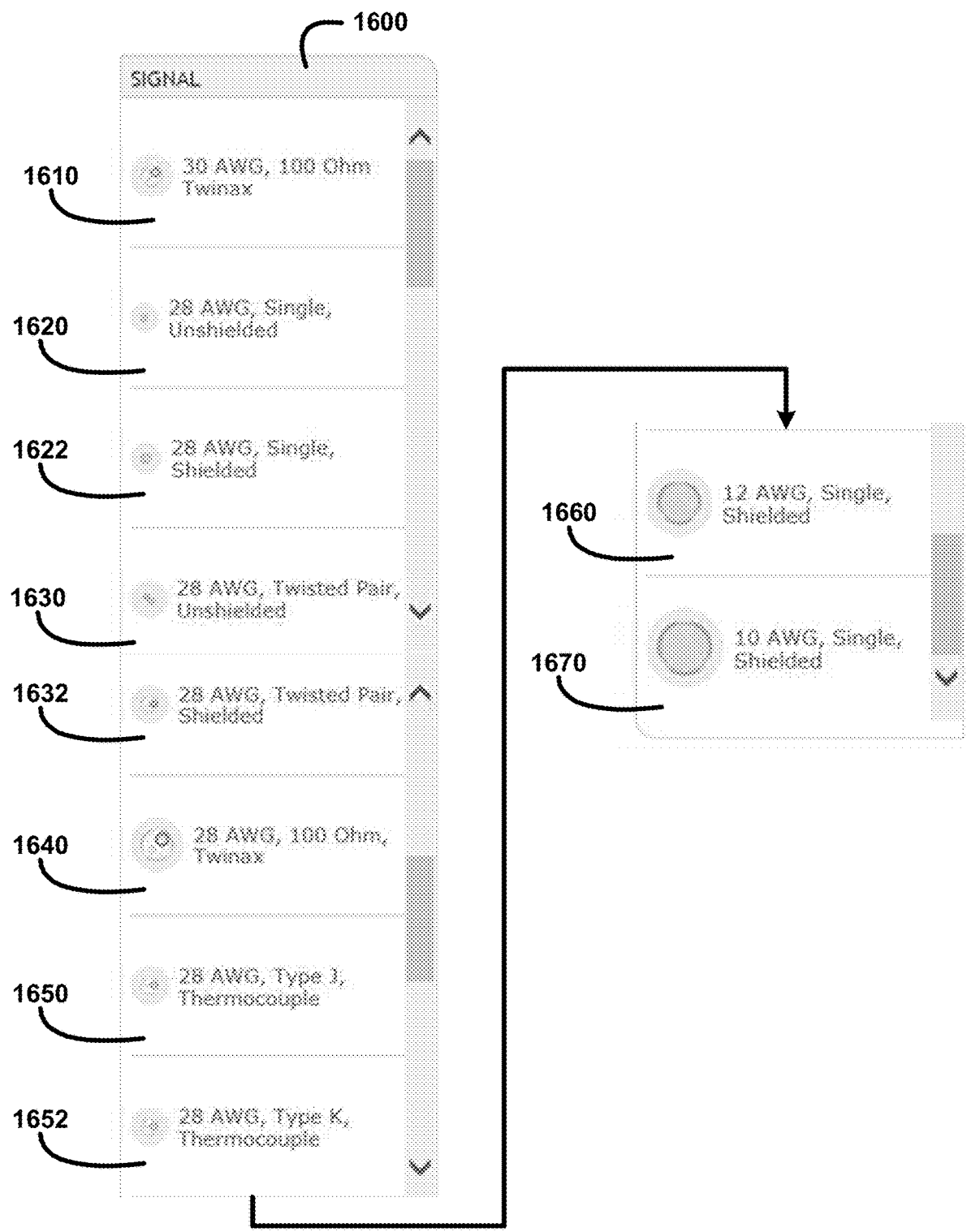
FIG. 16 shows for illustrative purposes only an example of a signal cable element group of one embodiment.

A Signal Cable Element Group:

FIG. 16 shows for illustrative purposes only an example of a signal cable element group of one embodiment. FIG. 16 shows an example of SIGNAL 1600 a cable element group. SIGNAL 1600 cable element group includes 30 AWG, 100 Ohm Twinax 1610, 28 AWG, Single, Unshielded 1620, 28 AWG, Single, Shielded 1622, 28 AWG, Twisted Pair, Unshielded 1630, 28 AWG, Twisted Pair, Shielded 1632, 28 AWG, 100 Ohm, Twinax 1640, 28 AWG, Type J, Thermocouple 1650, 28 AWG, Type K, Thermocouple 1652, 28 AWG, 5 Twisted Pairs, Shielded 1654, 26 AWG, Single, Shielded 1660, 26 AWG, Twisted Pair, Shielded 1662, 26 AWG, Twisted Tri, Shielded 1664, and 24 AWG, 100 Ohm, Twinax 1670 of one embodiment.

Figure 17:
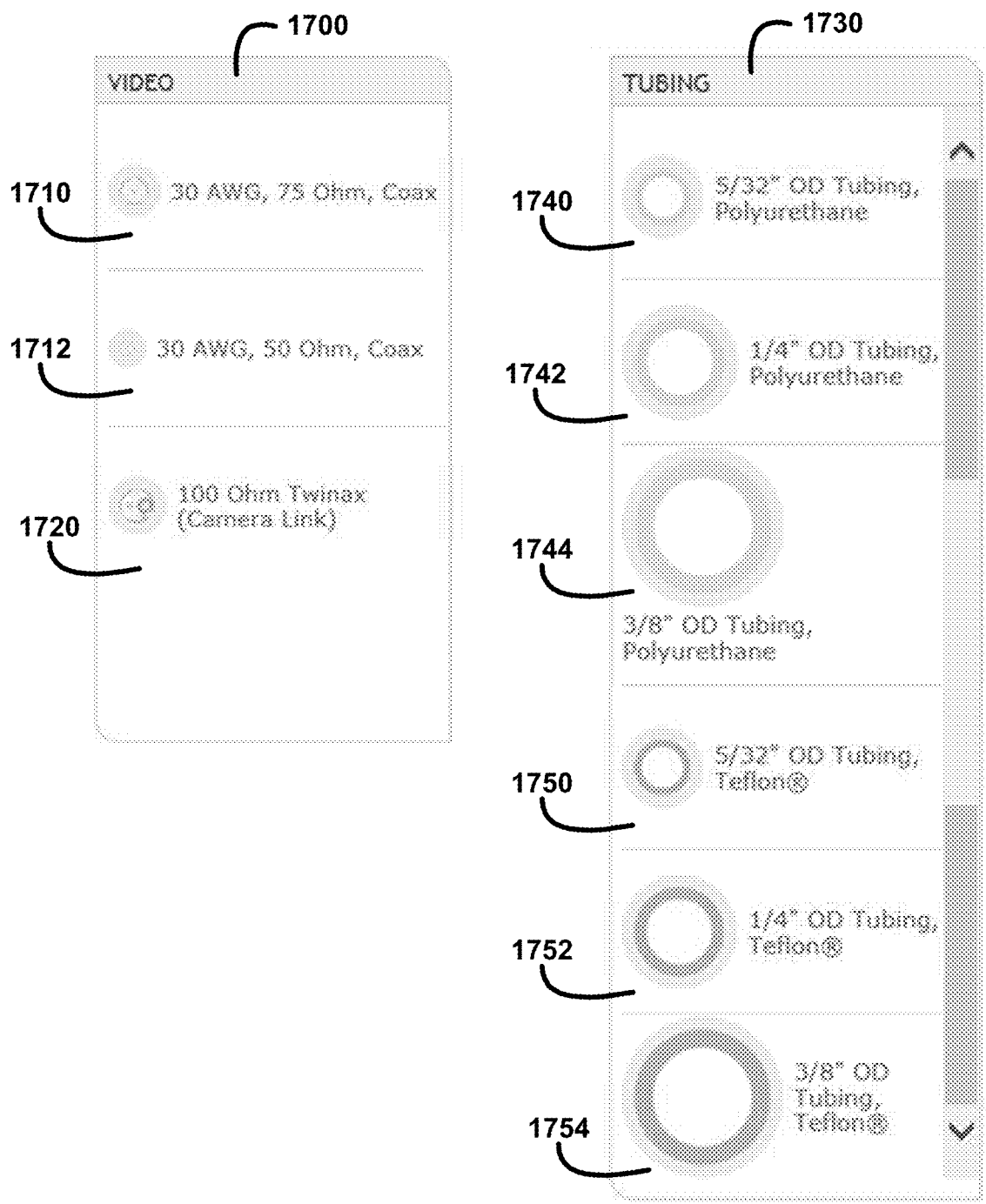
FIG. 17 shows for illustrative purposes only an example of video and tubing cable element groups of one embodiment.

Video and Tubing Cable Element Groups:

FIG. 17 shows for illustrative purposes only an example of video and tubing cable element groups of one embodiment. FIG. 17 shows an example of VIDEO 1700 a cable element group. VIDEO 1700 cable element group includes 30 AWG, 75 Ohm, Coax 1710, 30 AWG, 50 Ohm, Coax 1712, and 100 Ohm Twinax (Camera Link) 1720 of one embodiment. FIG. 17 shows an example of TUBING 1730 a cable element group. TUBING 1730 cable element group includes 5/32" OD Tubing, Polyurethane 1740, 1/4" OD Tubing, Polyurethane 1742, 3/8" OD Tubing, Polyurethane 1744, 5/32" OD Tubing, Teflon® 1750, 1/4" OD Tubing, Teflon® 1752, and 3/8" OD Tubing, Teflon® 1754 of one embodiment.

Figure 18:
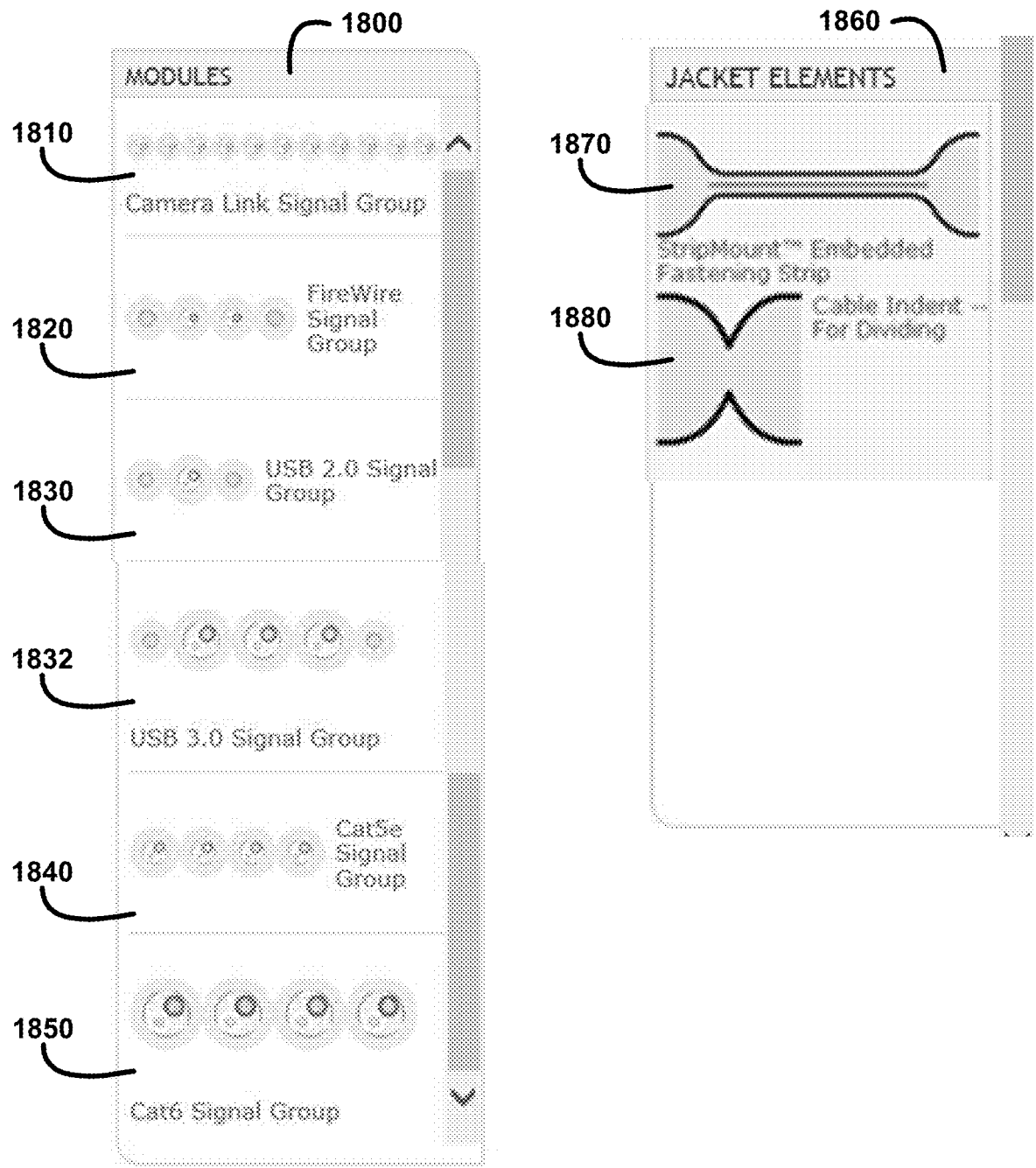
FIG. 18 shows for illustrative purposes only an example of modules and jacket elements cable element groups of one embodiment.

Modules and Jacket Elements Cable Element Groups:

FIG. 18 shows for illustrative purposes only an example of modules and jacket elements cable element groups of one embodiment. FIG. 18 shows an example of MODULES 1800 a cable element group. The MODULES 1800 cable element group includes Camera Link Signal Group 1810, FireWire Signal Group 1820, USB 2.0 Signal Group 1830, USB 3.0 Signal Group 1832, Cat5e Signal Group 1840 and Cat6 Signal Group 1850. FIG. 18 shows an example of JACKET ELEMENTS 1860 a cable element group. The JACKET ELEMENTS 1860 cable element group includes StripMount™ Embedded Fastening Strip 1870 and Cable Indent—For Dividing 1880 of one embodiment.

Figure 19:
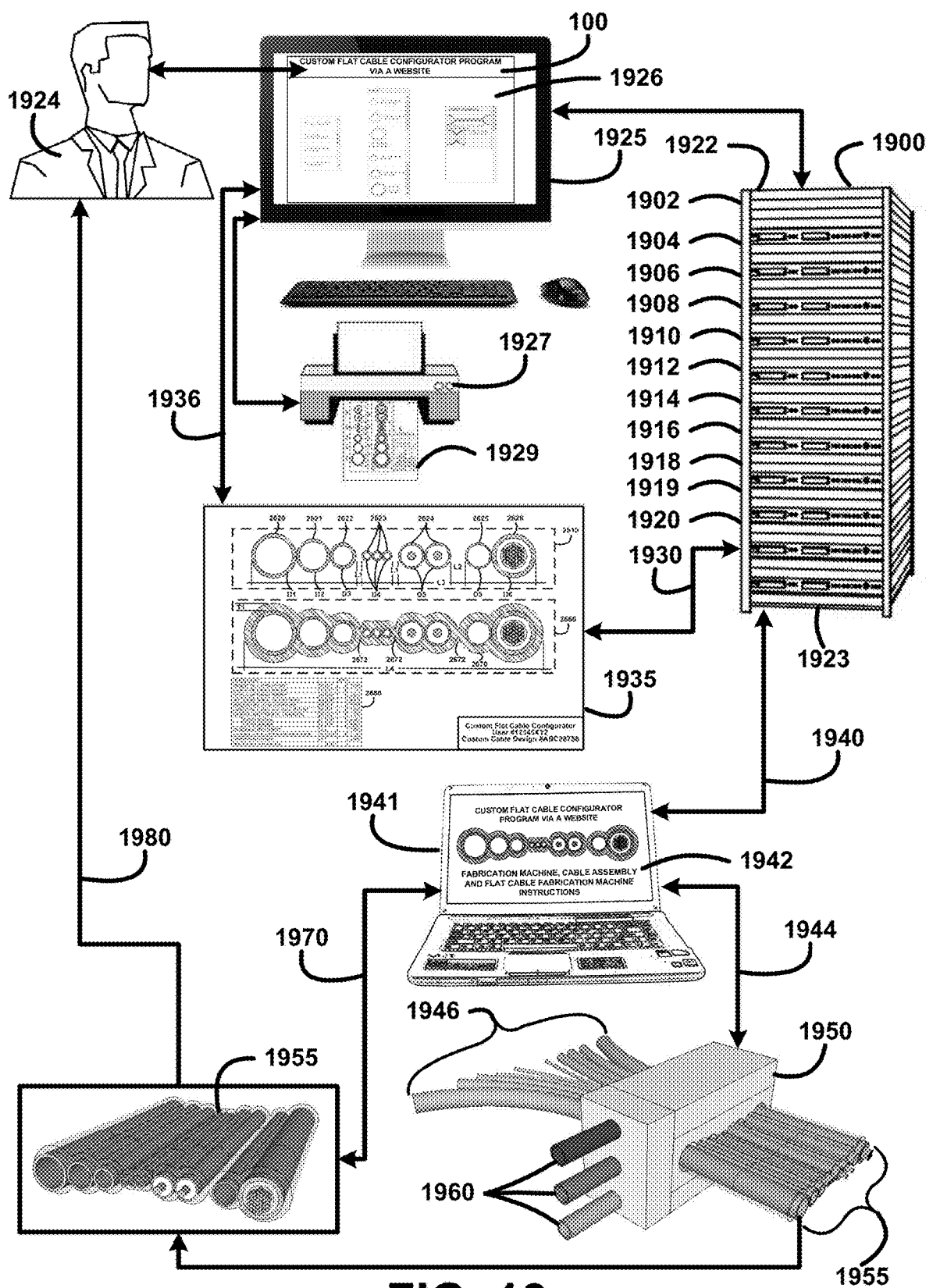
FIG. 19 shows for illustrative purposes only an example of an overview of a custom flat cable configurator of one embodiment.

Overview of a Custom Flat Cable Configurator:

FIG. 19 shows for illustrative purposes only an example of an overview of a custom flat cable configurator of one embodiment. FIG. 19 shows the custom flat cable configurator that includes at least one server 1900, at least one digital database 1902, at least one digital processor 1904, at least one WIFI connectable device 1906, at least one printer 1908, at least one internet connectable device 1910, a cable life calculator 1912, a cable thickness of insulation calculator 1914, conduit/tubing spacing calculator 1916, cable dimensions calculator 1918, fabrication machine activator 1919, packaging and shipping activator 1920, at least one interactive website 1922, at least one digital memory storage device 1923, and at least one CAD device 1926.

A user 1924 using a user computer 1925 uses the custom flat cable configurator program via a website 100. The custom flat cable configurator produces from user selected cable elements at least one custom flat cable design drawing 1935. The user submits the custom flat cable design to be recorded on a digital memory storage device of the server. The user 1924 receives the at least one custom flat cable design drawing transmitted to the user computer via internet 1936 on the user computer 1925. A user printer 1927 is used for printing the at least one custom flat cable design drawing 1929. The at least one server 1900 is coupled to a digital computer fabrication interface 1942 wherein the at least one server is transmitting and receiving fabrication data 1940 to and from at least one fabrication computer 1941 coupled to at least one fabrication machine 1950. Fabrication machine, cable assembly and flat cable fabrication device instructions 1944 are transmitted to the at least one fabrication machine 1950 to begin a cable elements assembly process 1946 to produce an encapsulated custom flat cable product 1955.

Encapsulation materials and curing process materials inlets 1960 supply insulation encapsulation materials in the fabrication machine 1950 to encapsulate the assembled custom flat cable elements. Automated custom flat cable packaging and shipping instructions 1970 process the packaging and shipping documents and pickup/delivery arrangements for the encapsulated custom flat cable product 1955 so the custom flat cable product is shipped to user 1980 of one embodiment.

Figure 20:
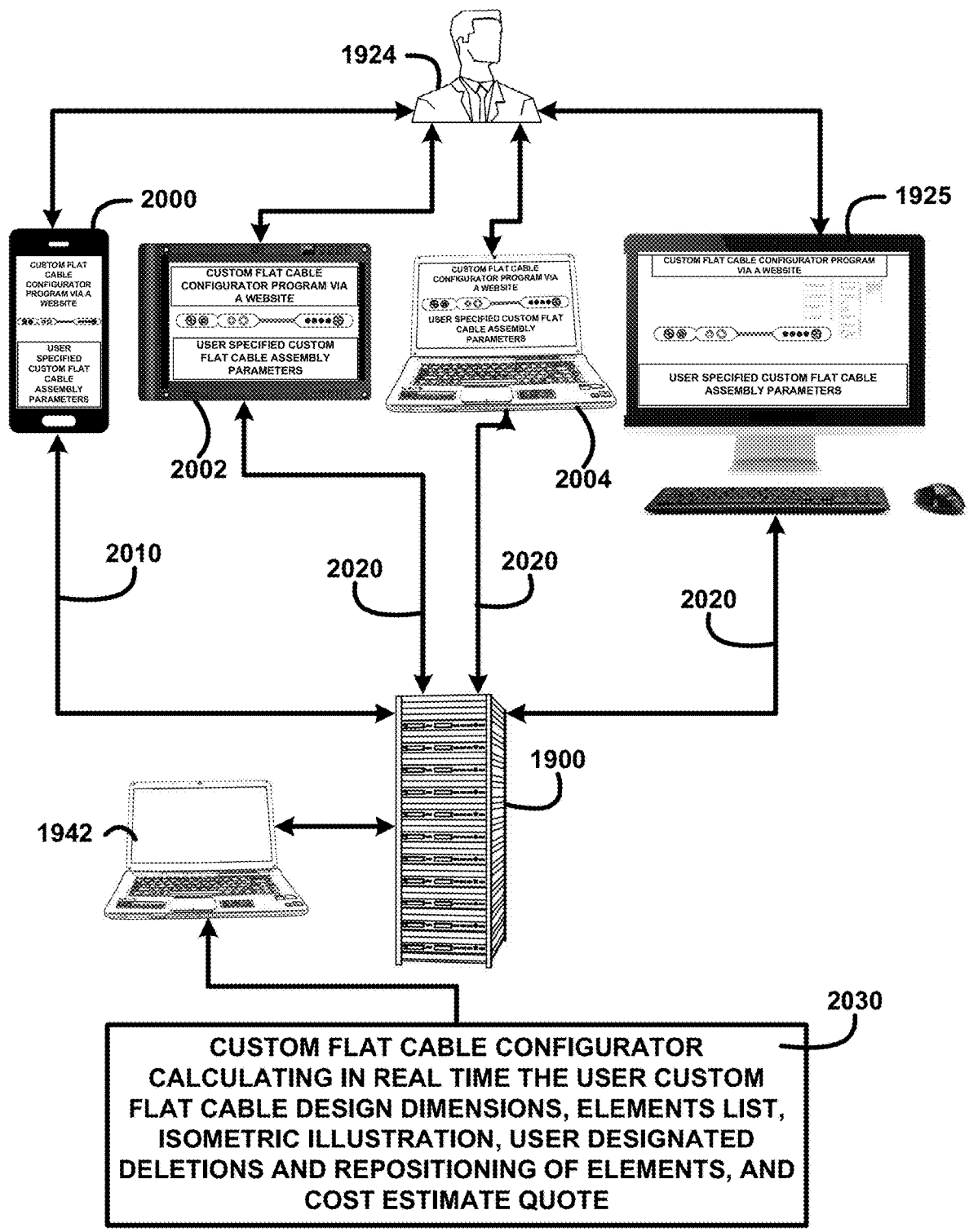
FIG. 20 shows for illustrative purposes only an example of user connectivity to custom flat cable configurator of one embodiment.

Detailed Custom Flat Cable Configurator Process Description:

FIG. 20 shows for illustrative purposes only an example of user connectivity to custom flat cable configurator of one embodiment. FIG. 20 shows the user 1924 and user computer 1925 as one example of a user's way of connecting with the custom flat cable configurator interactive user interface 1926. Other examples of a user connectivity with the custom flat cable configurator program via a website 100 OF FIG. 1 are a user smart phone 2000, user tablet 2002, and user laptop computer 2004. Using any of the devices a user can input user specified custom flat cable assembly parameters and a user selected custom flat cable design for uses and storage in the at least one server 1900. The at least one server 1900 can use a digital computer fabrication interface 1942 in part for custom flat cable configurator calculating in real time the user custom flat cable design dimensions, elements list, isometric illustration, user designated deletions and repositioning of elements, and cost estimate quote 2030 of one embodiment.

Figure 21:
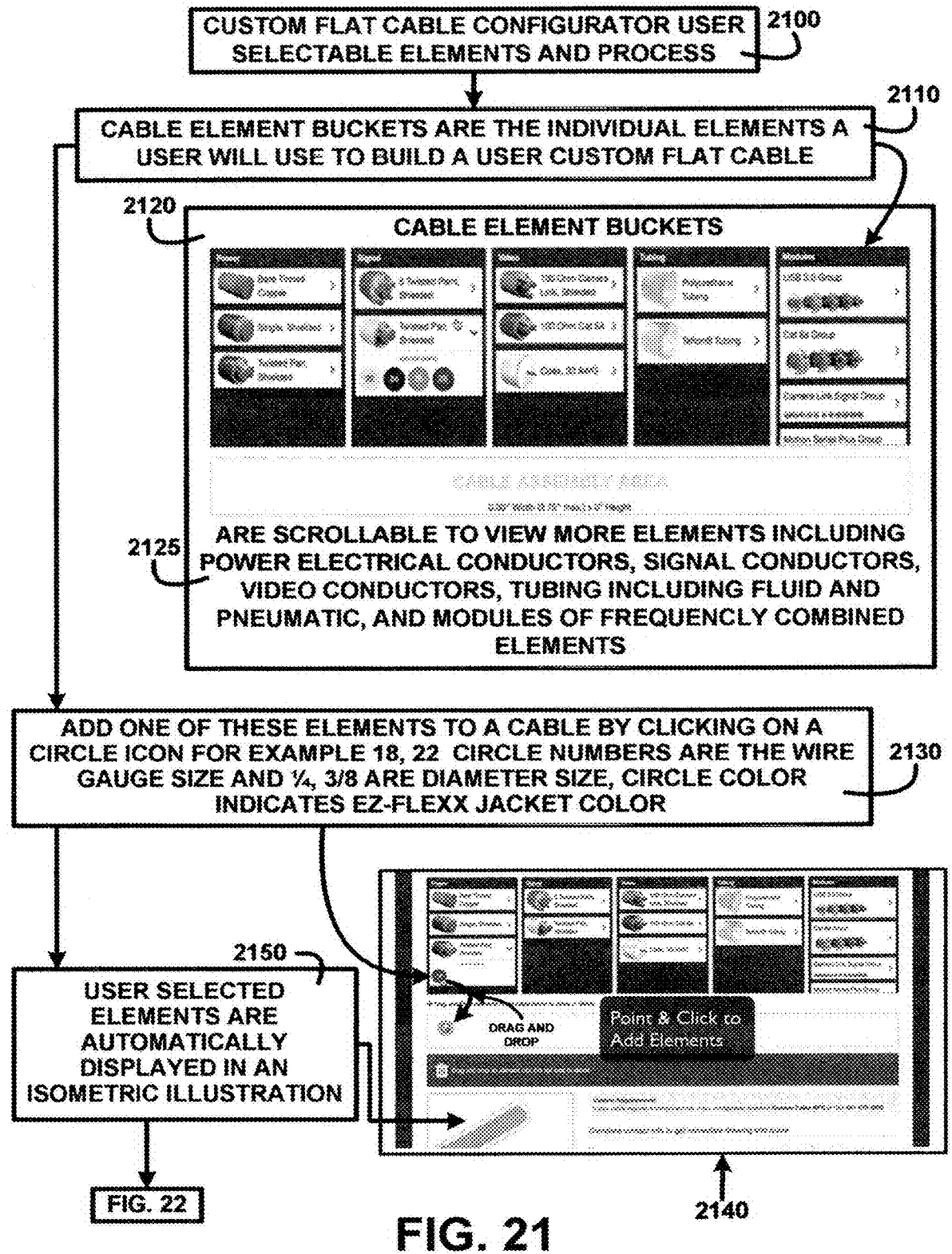
FIG. 21 shows for illustrative purposes only an example of custom flat cable configurator process of one embodiment.

Custom Flat Cable Configurator Process:

FIG. 21 shows for illustrative purposes only an example of custom flat cable configurator process of one embodiment. FIG. 21 shows a custom flat cable configurator user selectable elements and process 2100. A user can find cable element buckets contain the individual elements a user will use to build a user custom flat cable 2110. Cable element buckets 2120 are scrollable to view more elements including power electrical conductors, signal conductors, video conductors, tubing including fluid and pneumatic, and modules of frequency combined elements 2125. A user can add one of these elements to a cable for example by clicking on a circle icon for example 18, 22 circle numbers are the wire gauge size and 1/4, 3/8 are diameter size, circle color indicates EZ-Flexx™ jacket color 2130 as shown in a cable assembly area webpage 2140 where user selected elements are automatically displayed in an isometric illustration 2150. The process continues in FIG. 22.

Figure 22:
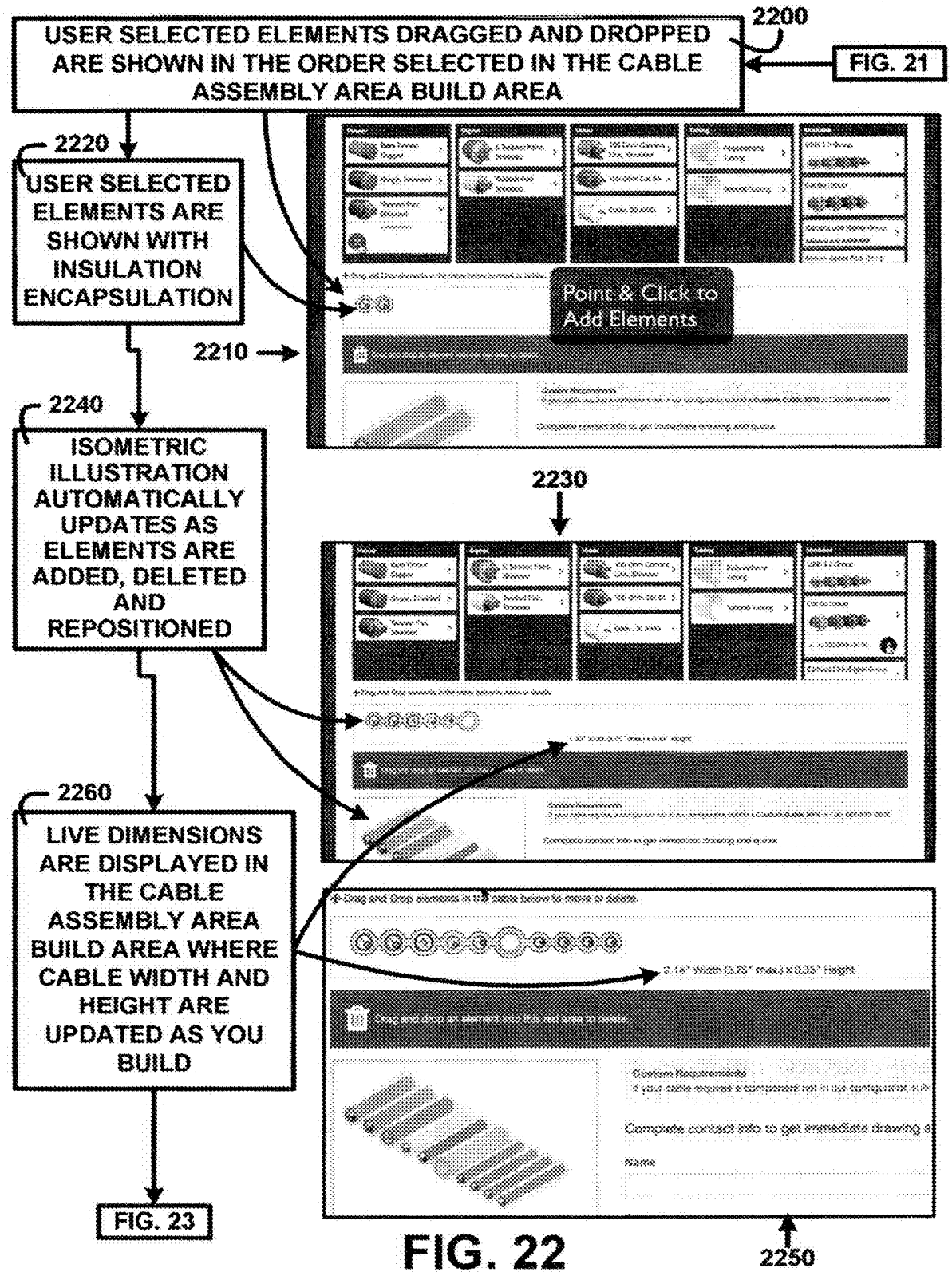
FIG. 22 shows for illustrative purposes only an example of custom flat cable configurator isometric illustration process of one embodiment.

Custom Flat Cable Configurator Isometric Illustration Process:

FIG. 22 shows for illustrative purposes only an example of custom flat cable configurator isometric illustration process of one embodiment. FIG. 22 shows a continuation from FIG. 21 where user selected elements dragged and dropped are shown in the order selected in the cable assembly area build area 2200 as seen on a cable assembly area build image webpage 2210. User selected elements are shown with insulation encapsulation 2220. An isometric illustration image web page 2230 shows that an isometric illustration automatically updates as elements are added, deleted and repositioned 2240. The initial user selected elements web page 2250 shows live dimensions are displayed in the cable assembly area build area where cable width and height are updated as you build 2260. Additional processing is shown in FIG. 23.

Figure 23:
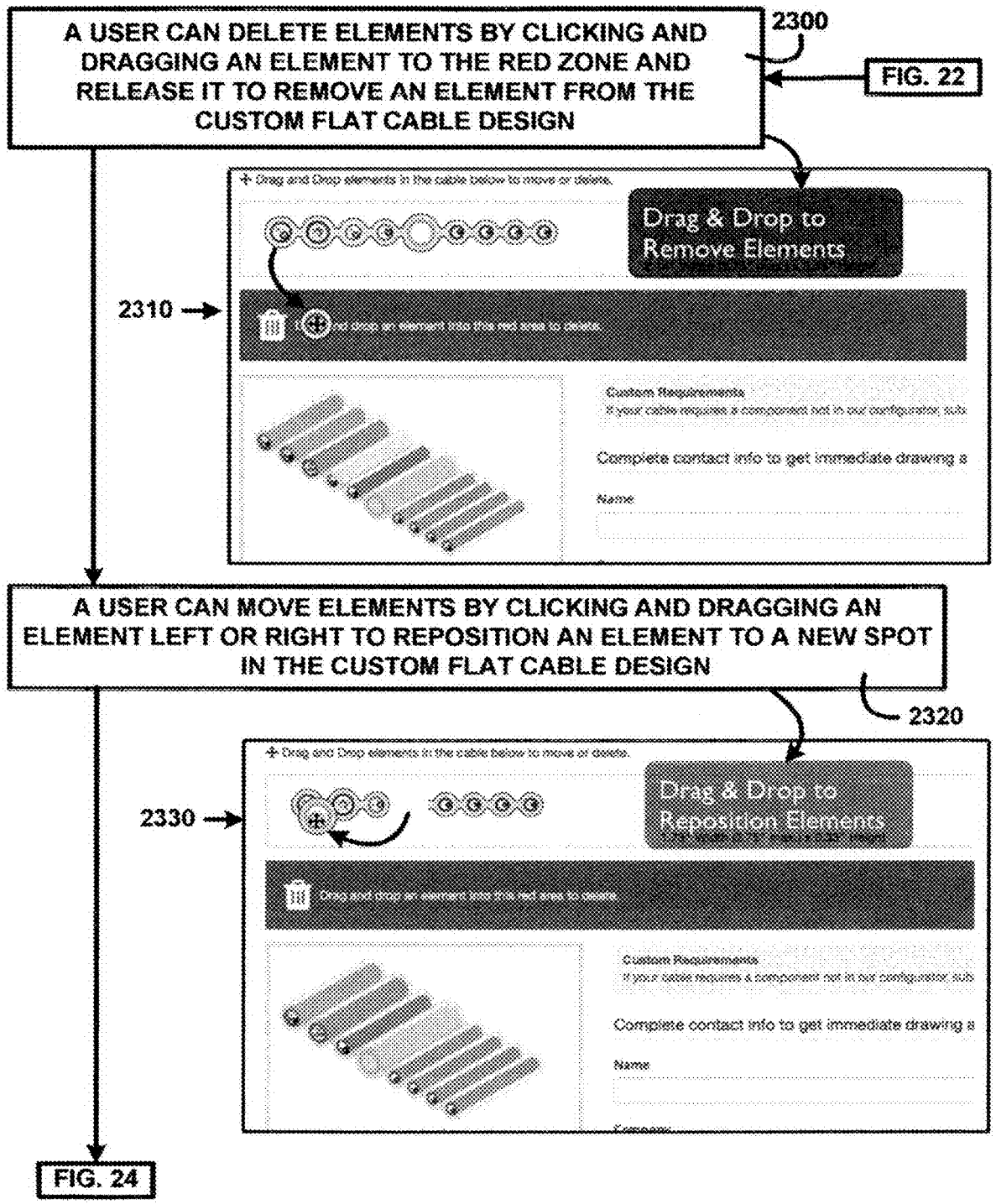
FIG. 23 shows for illustrative purposes only an example of custom flat cable configurator element deletion and move processes of one embodiment.

Custom Flat Cable Configurator Element Deletion and Move Processes:

FIG. 23 shows for illustrative purposes only an example of custom flat cable configurator element deletion and move processes of one embodiment. FIG. 23 shows continuing from FIG. 22 a user can delete elements by clicking and dragging an element to the red zone and release it to remove an element from the custom flat cable design 2264 as seen on a delete element web page 2310. A user can reconfigure a custom flat cable design where a user can move elements by clicking and dragging an element left or right to reposition an element to a new spot in the custom flat cable design 2320 as seen on a moving elements web page 2330. Processing continues in FIG. 24.

Figure 24:
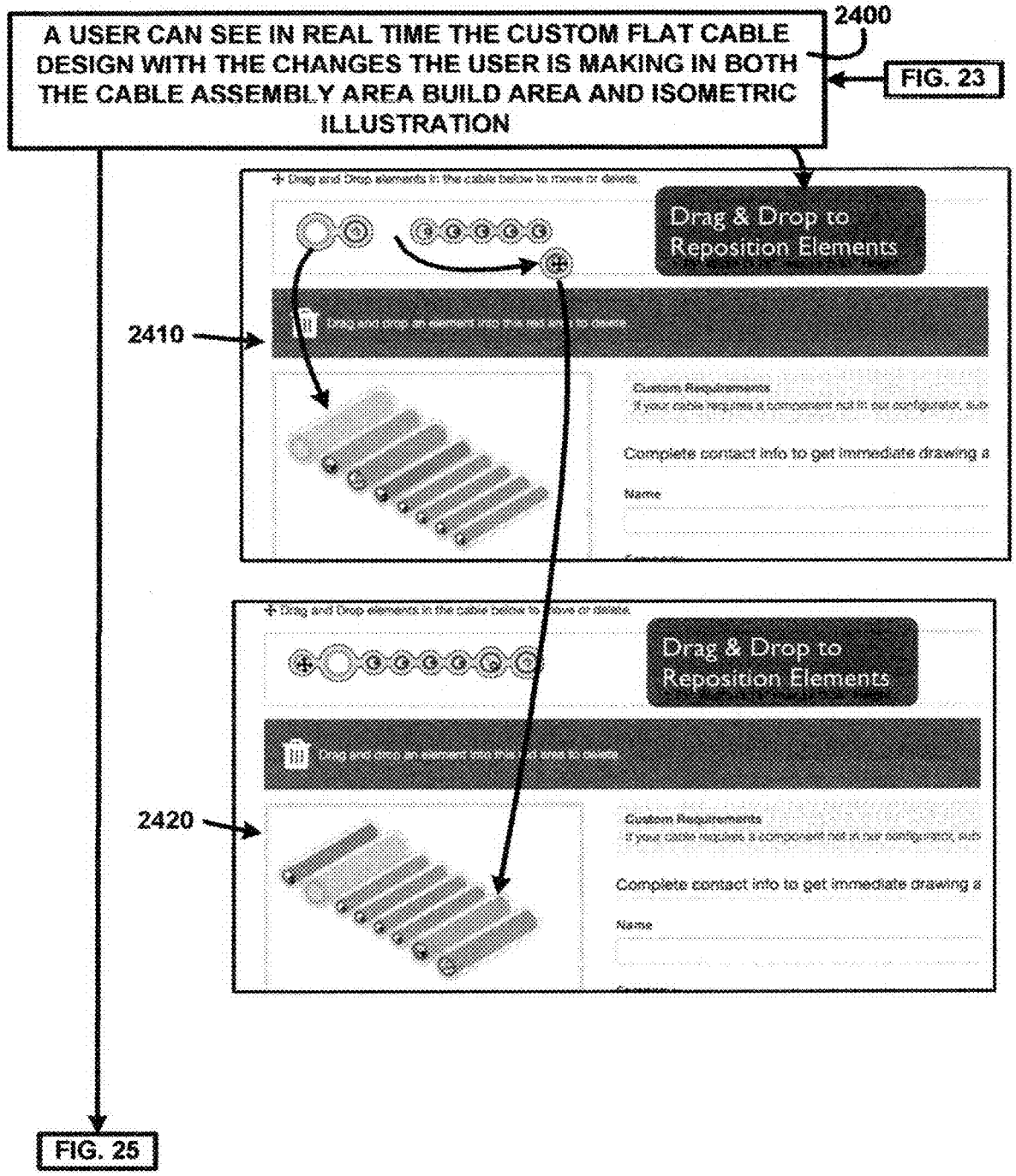
FIG. 24 shows for illustrative purposes only an example of custom flat cable configurator element repositioning processes of one embodiment.
Figure 25:
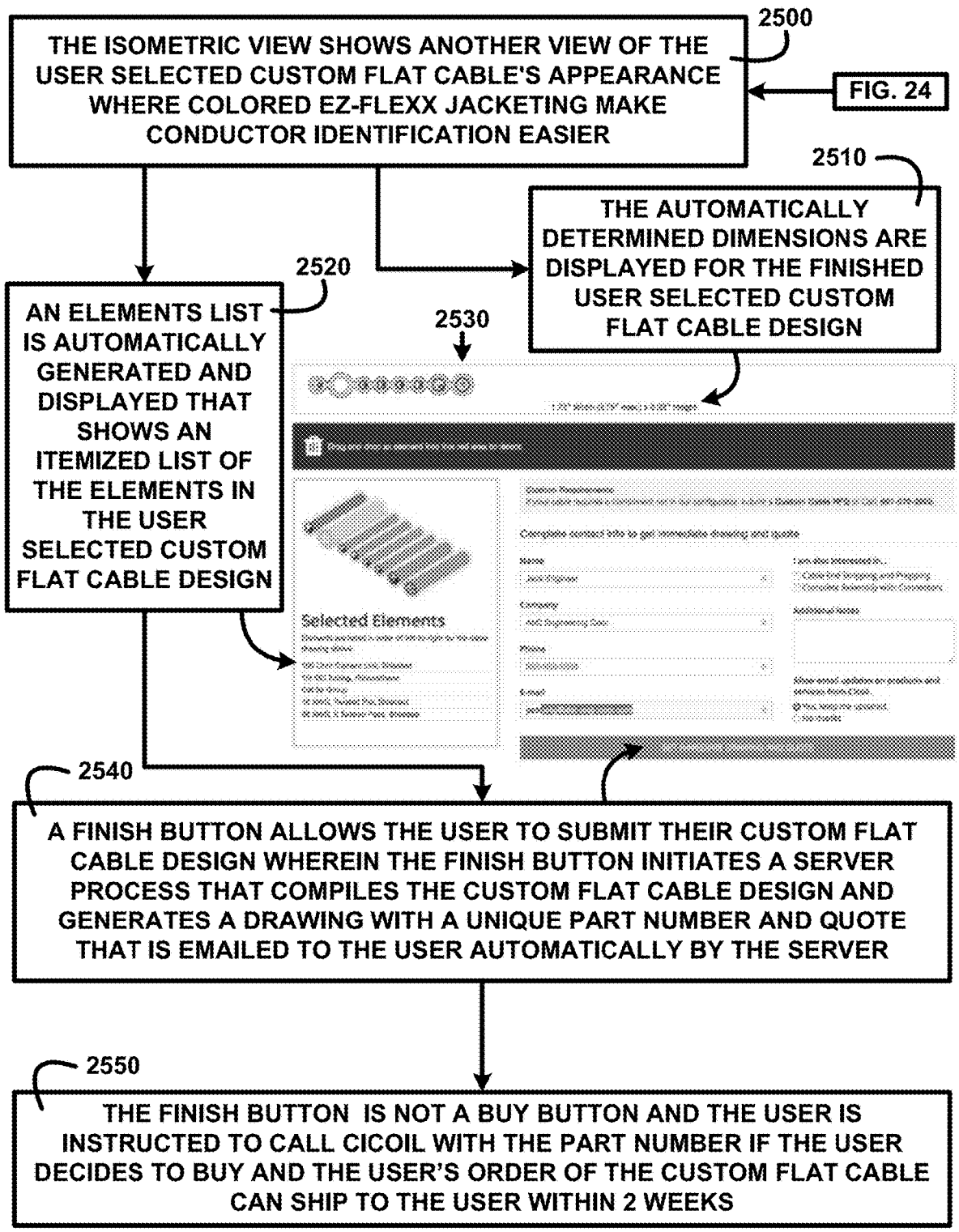
FIG. 25 shows for illustrative purposes only an example of custom flat cable configurator finish button process of one embodiment.

Custom Flat Cable Configurator Element Repositioning Processes:

FIG. 24 shows for illustrative purposes only an example of custom flat cable configurator element repositioning processes of one embodiment. FIG. 24 shows processing continuing from FIG. 23 where a user can see in real time the custom flat cable design with the changes the user is making in both the cable assembly area build area and isometric illustration 2400 as seen in a repositioning cable elements web page 2410 and repositioned cable elements isometric illustration web page 2420. FIG. 25 shows continuing processing using the custom flat cable configurator.

Custom Flat Cable Configurator Finish Button Process:

FIG. 25 shows for illustrative purposes only an example of custom flat cable configurator finish button process of one embodiment. FIG. 25 shows processing continuing from FIG. 24 where the isometric view shows another view of the user selected custom flat cable's appearance where colored EZ-Flexx™ jacketing make conductor identification easier 2500. The automatically determined dimensions are displayed for the finished user selected custom flat cable design 2510. An elements list is automatically generated and displayed that shows an itemized list of the elements in the user selected custom flat cable design 2520 on a live dimensions web page 2530.

A finish button allows the user to submit their custom flat cable design wherein the finish button initiates a server process that compiles the custom flat cable design and generates a drawing with a unique part number and quote that is emailed to the user automatically by the server 2540. The finish button is not a buy button and the user is instructed to call with the part number if the user decides to buy and the user's order of the custom flat cable can ship to the user within 2 weeks 2550 of one embodiment.

Figure 26:
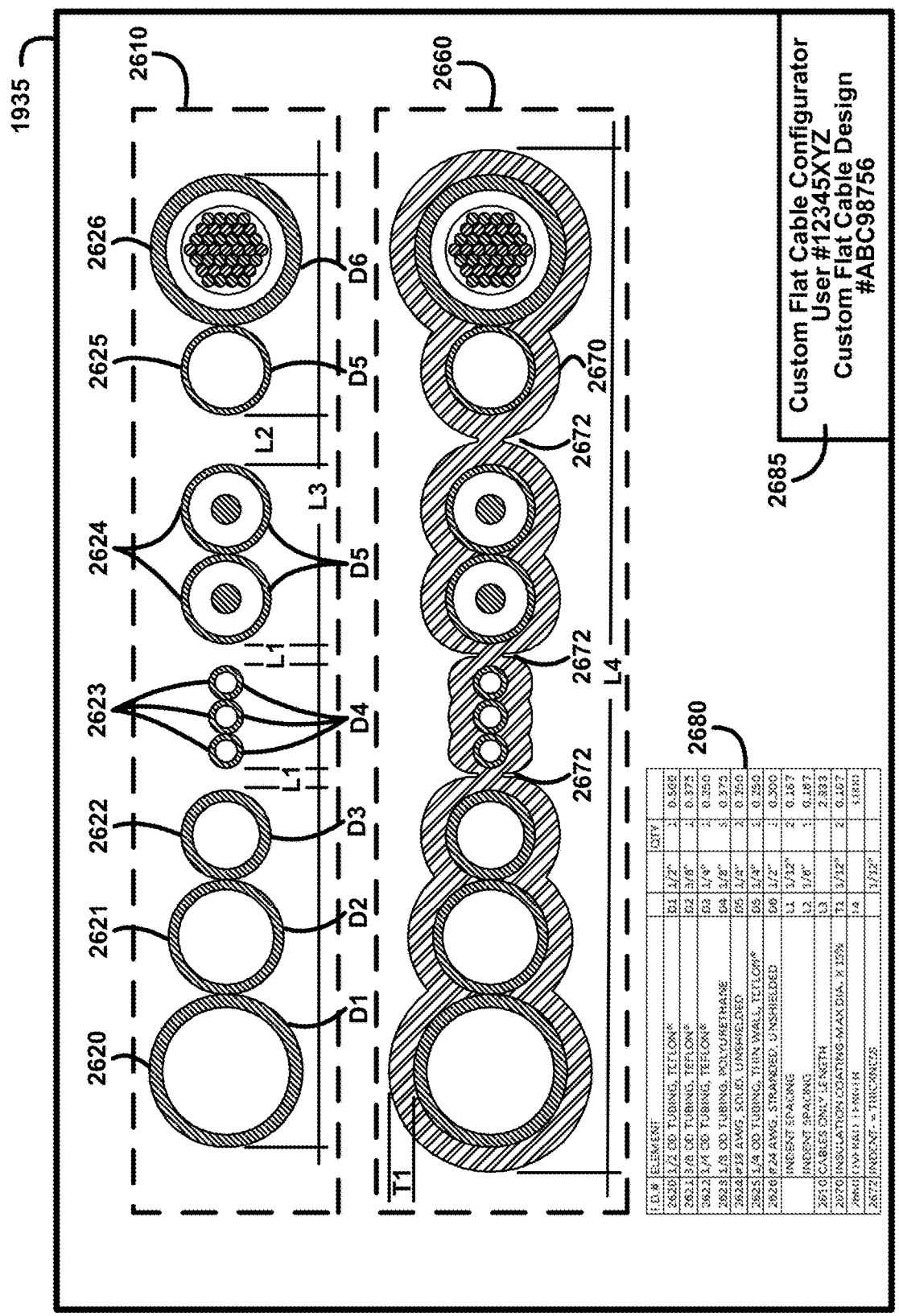
FIG. 26 shows for illustrative purposes only an example of custom flat cable design drawing of one embodiment.

Custom Flat Cable Design Drawing:

FIG. 26 shows for illustrative purposes only an example of custom flat cable design drawing of one embodiment. FIG. 26 shows the at least one custom flat cable design drawing 1935 that includes a user selected custom flat cable elements drawing table 2680. The user selected custom flat cable elements drawing table 2680 includes the list of selected elements and the quantity, their gauge AWG size conductors, diameter, spacing for indents and a total width of the cable.

In addition the table shows an insulation thickness calculation for example for an insulation encapsulation following the cable profile and the adjusted overall cable width and height including the encapsulation. Also shown in the user selected custom flat cable elements drawing table 2680 is a drawing title block with a unique design number 2685 the user can use to order their customized flat cable design. Showing in the drawing are element #1 2620, element #2 2621, element #3 2622, element #4 2623, element #5 2624, element #6 2625, element #7 2626 in their custom flat cable element positions 2610.

Different elements may have different diameters which affects the overall cable width and height dimensions as seen in element diameter #1 D1, element diameter #2 D2, element diameter #3 D3, element diameter #4 D4, element diameter #5 D5, and element diameter #6 D6. In the calculation of the dimensions there is also included any element spacing for example a space for an indent used to split the cable more easily. The at least one custom flat cable design drawing 1935 shows element spacing #1 L1 and element spacing #2 L2 for each indent element 2672 which are included in the overall width dimension shown as element spacing #3 L3.

An insulated custom flat cable design 2660 shows an insulation coating surface 2670 created with the insulation encapsulation. An insulation thickness T1 is shown as calculated using the data from the user selected custom flat cable elements drawing table 2680. The overall cable width L4 includes the addition of the insulation thickness at both sides and top and bottom for an adjusted height calculation of one embodiment.

Figure 27A:
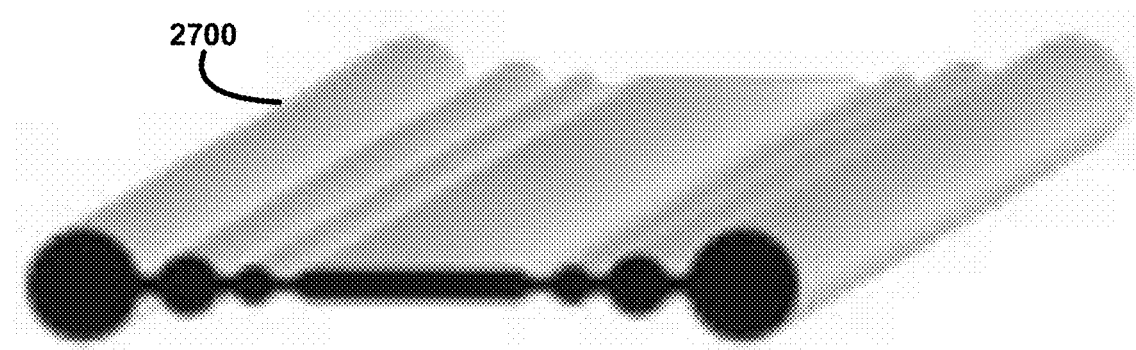
FIG. 27A shows for illustrative purposes only an example of profile contour insulation encapsulation of one embodiment.

Profile Contour Insulation Encapsulation:

FIG. 27A shows for illustrative purposes only an example of profile contour insulation encapsulation of one embodiment. FIG. 27A shows an example of a profile contour insulation encapsulation 2700 wherein the insulation encapsulation applied conforming to the contours of the cable elements including indents and embedded fastening strips of one embodiment.

Figure 27B:
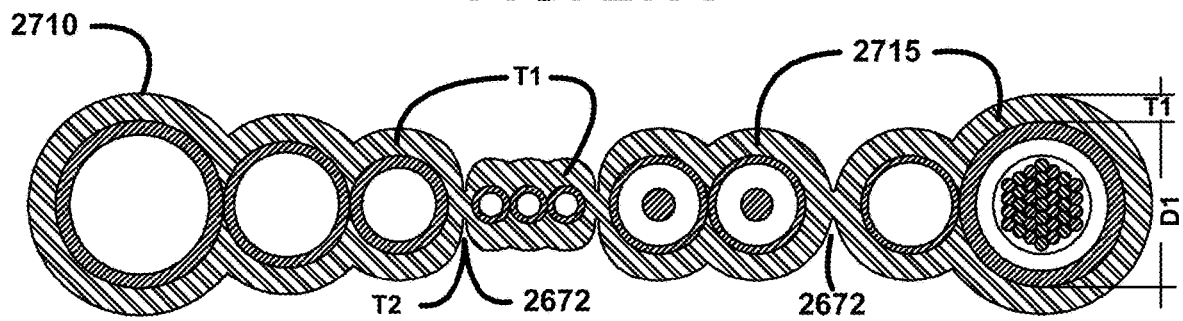
FIG. 27B shows for illustrative purposes only an example of custom flat cable encapsulated profile of one embodiment.

Custom Flat Cable Encapsulated Profile:

FIG. 27B shows for illustrative purposes only an example of custom flat cable encapsulated profile of one embodiment. FIG. 27B shows a custom flat cable encapsulated profile 2710 with an element diameter #1 D1 and insulation thickness T1 wherein a element insulation thickness 2715 follows the contour of the cable elements except it thins for an indent insulation thickness T2 for each indent element 2672 of one embodiment.

Figure 27C:
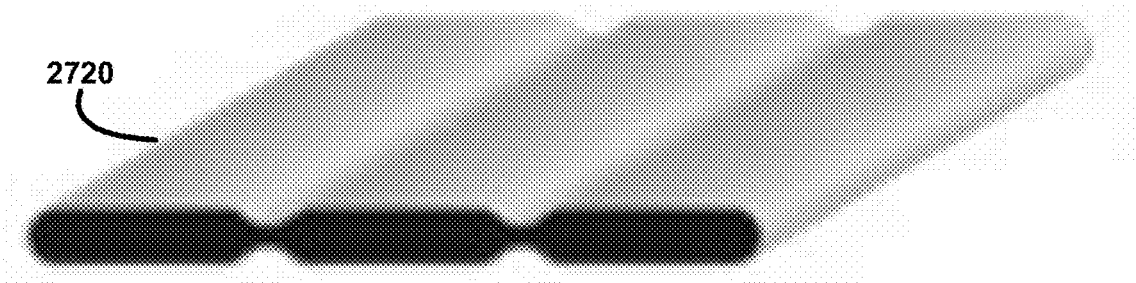
FIG. 27C shows for illustrative purposes only an example of uniform flat surface insulation encapsulation of one embodiment.

Uniform Flat Surface Insulation Encapsulation:

FIG. 27C shows for illustrative purposes only an example of uniform flat surface insulation encapsulation of one embodiment. FIG. 27C show a uniform flat surface insulation thickness 2720 creating flat surface over the cable element groups except for the indent elements. The flat surfaces and uniform flat surface insulation encapsulation can be selected by a user where the application use may for example place the cable along an object or structure with a flat surface and the custom flat cable user design will maintain a stable position when in contact with the object or structure of one embodiment.

Figure 27D:
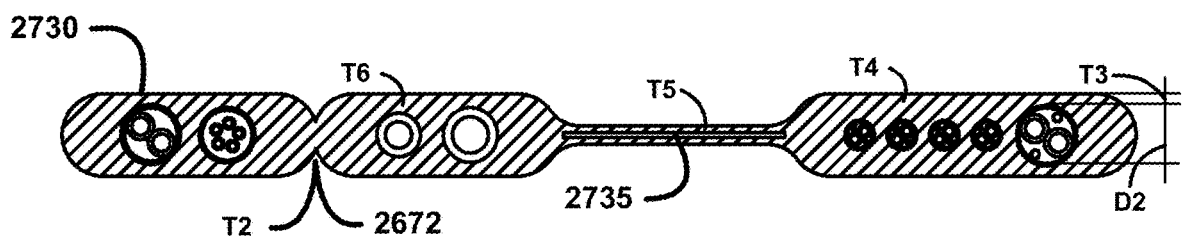
FIG. 27D shows for illustrative purposes only an example of uniform flat surface insulation profile of one embodiment.

Uniform Flat Surface Insulation Profile:

FIG. 27D shows for illustrative purposes only an example of uniform flat surface insulation profile of one embodiment. FIG. 27D shows an element diameter #2 D2 and varied insulation thickness T3, insulation thickness T4, insulation thickness T5, insulation thickness T6, and an indent insulation thickness T2 for each indent element 2672 and embedded fastening strip element 2735. Wherein the insulation thickness between the flat surfaces is greater than the largest diameter of an element 2730 of one embodiment.

Figure 28A:
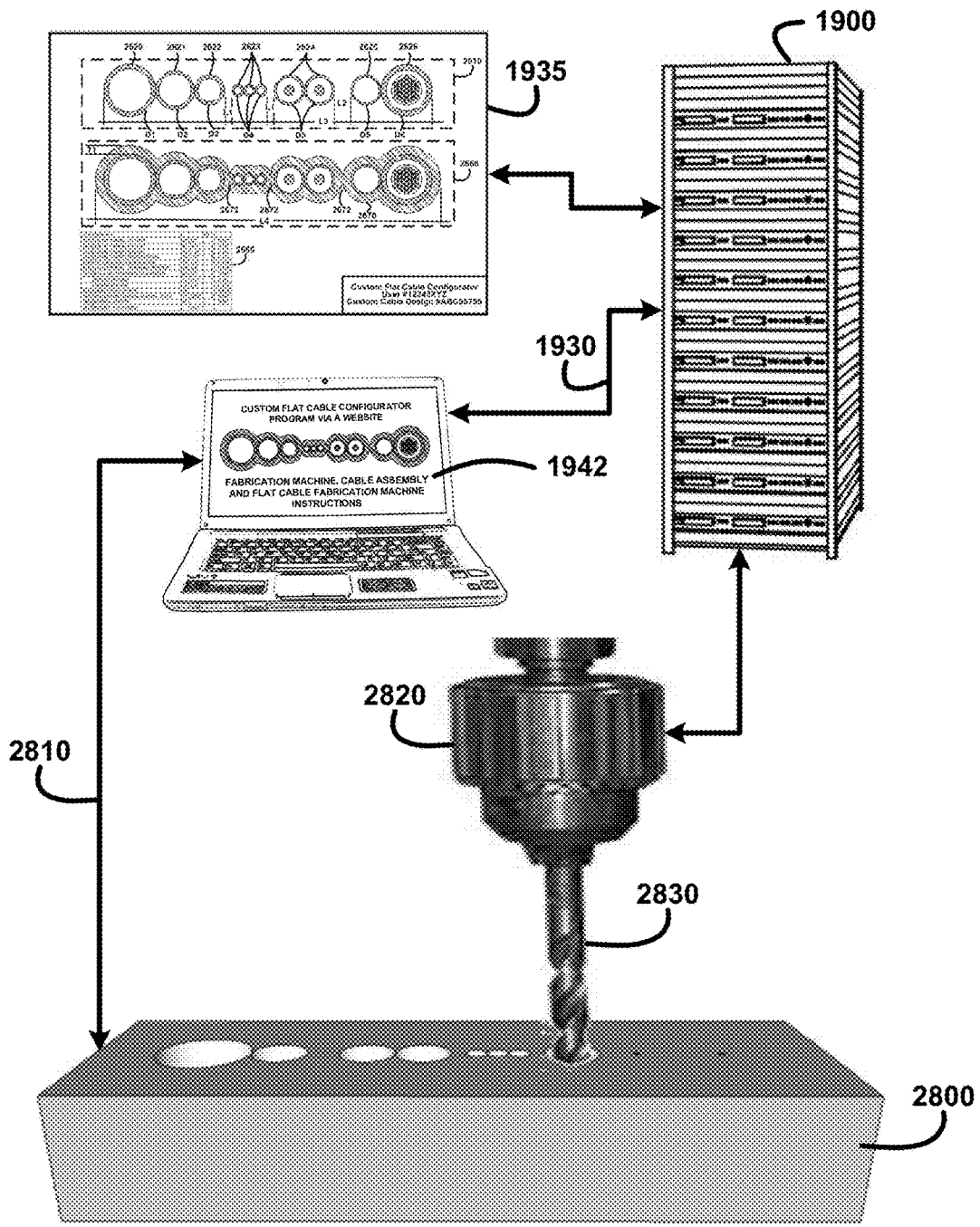
FIG. 28A shows for illustrative purposes only an example of drilling predetermined cable element assembly mounting hole of one embodiment.

Drilling Predetermined Cable Element Assembly Mounting Hole:

FIG. 28A shows for illustrative purposes only an example of drilling predetermined cable element assembly mounting hole of one embodiment. FIG. 28A shows the at least one server 1900, at least one custom flat cable design drawing 1935 and digital computer fabrication interface 1942. Shown in this example the at least one server is transmitting and receiving fabrication data 1940 to and from a fabrication machine using an automatic tool changer to insert a predetermined drill size 2820. The fabrication machine proceeds with a process for drilling predetermined cable element assembly mounting holes 2830 and transmitting placement of cable element assembly mounting block 2810 in which to drill the holes that are corresponding to the individual cable elements in accordance with the user selected elements in the custom flat cable design. The drilled cable element assembly mounting block 2810 is used to position and assemble the selected cable elements in preparation for encapsulation of one embodiment.

Figure 28B:
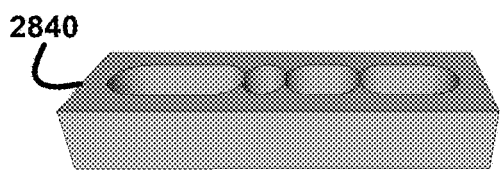
FIG. 28B shows for illustrative purposes only an example of uniform flat surface insulation thickness extrusion key of one embodiment.

Uniform Flat Surface Insulation Thickness Extrusion Key:

FIG. 28B shows for illustrative purposes only an example of uniform flat surface insulation thickness extrusion key of one embodiment. FIG. 28B shows a uniform flat surface insulation thickness extrusion key 2840. The uniform flat surface insulation thickness extrusion key 2840 is drilled or cut in order to form the insulation encapsulation form for a complementary custom flat cable design of one embodiment.

Figure 28C:
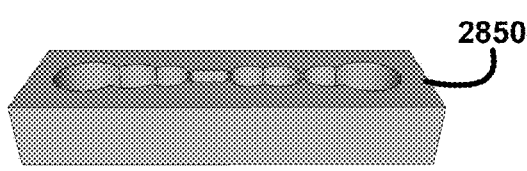
FIG. 28C shows for illustrative purposes only an example of custom flat cable encapsulated profile extrusion key of one embodiment.

Custom Flat Cable Encapsulated Profile Extrusion Key:

FIG. 28C shows for illustrative purposes only an example of custom flat cable encapsulated profile extrusion key of one embodiment. FIG. 28C shows a custom flat cable encapsulated profile extrusion key 2850. The custom flat cable encapsulated profile extrusion key 2850 is drilled or cut in order to form the insulation encapsulation form for a complementary custom flat cable design of one embodiment.

Figure 29A:
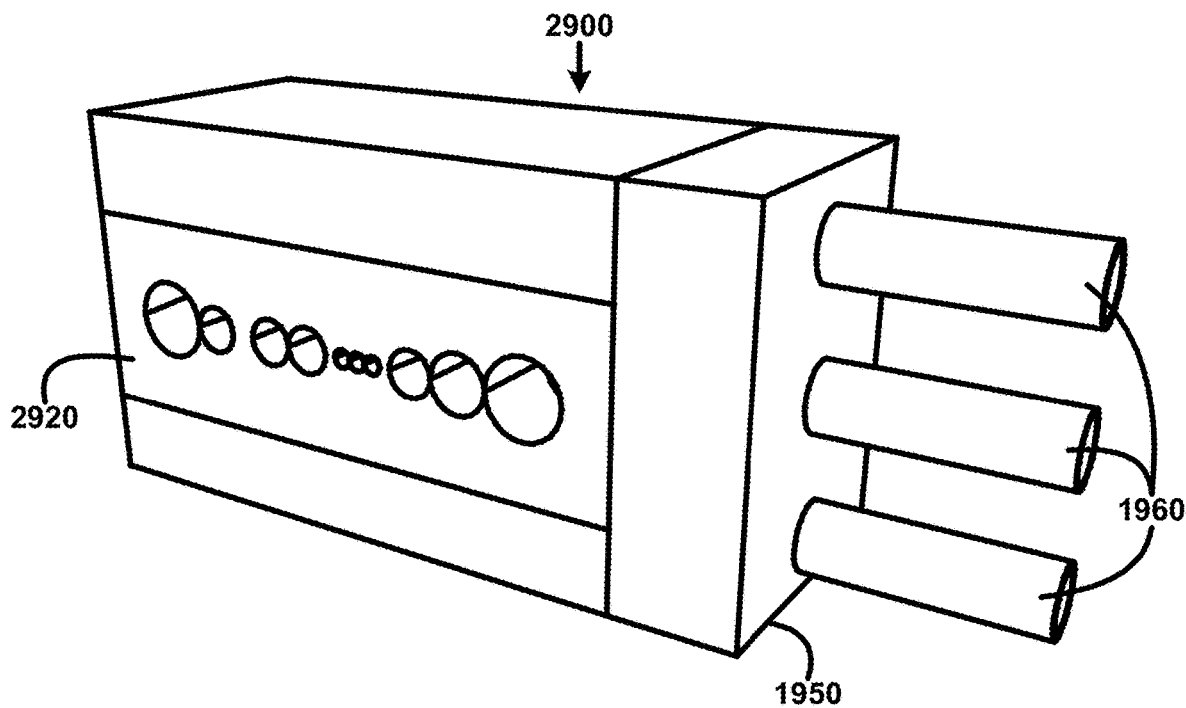
FIG. 29A shows for illustrative purposes only an example of custom flat cable element assembly mounting hole one piece block of one embodiment.

Custom Flat Cable Element Assembly Mounting Holes One Piece Block:

FIG. 29A shows for illustrative purposes only an example of custom flat cable element assembly mounting holes one piece block of one embodiment. FIG. 29A shows a custom flat cable encapsulated profile fabrication assembly encapsulation device 2900 for use with the fabrication machine 1950. The materials for insulation encapsulation are supplied to the custom flat cable encapsulated profile fabrication assembly encapsulation device 2900 using encapsulation materials and curing process materials inlets 1960. In this example is used a custom flat cable element assembly mounting hole one piece block 2920. The custom flat cable element assembly mounting hole one piece block 2920 is made from a single solid block of material for the placement and assembly of cable elements of one embodiment.

Figure 29B:
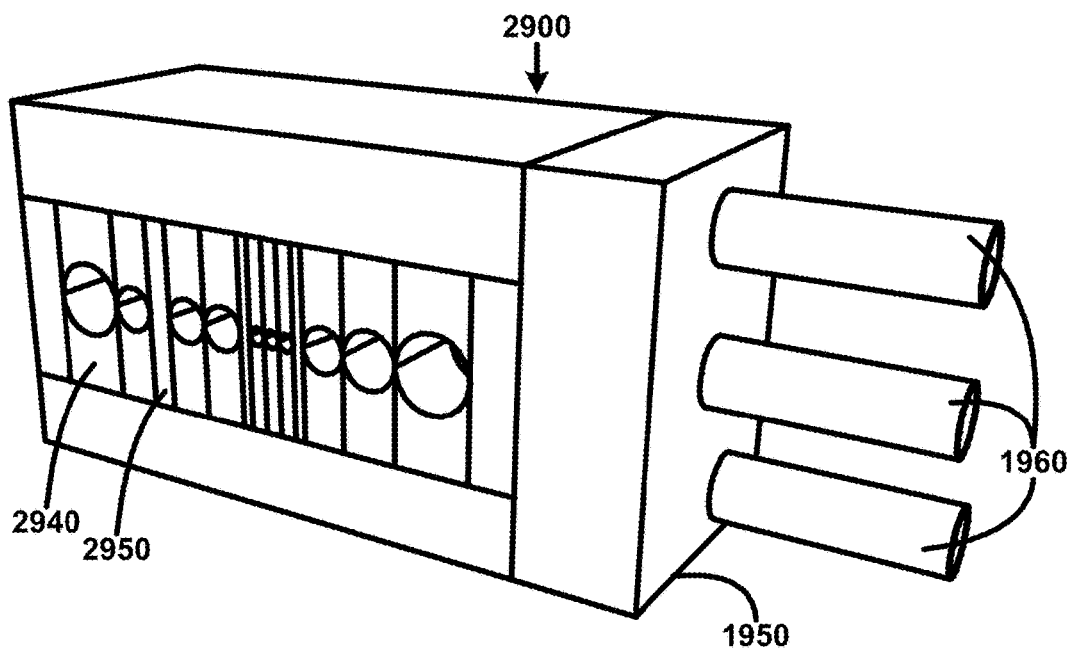
FIG. 29B shows for illustrative purposes only an example of custom flat cable element assembly mounting hole segmented block of one embodiment.

Custom Flat Cable Element Assembly Mounting Hole Segmented Block:

FIG. 29B shows for illustrative purposes only an example of custom flat cable element assembly mounting hole segmented block of one embodiment. FIG. 29B shows a custom flat cable encapsulated profile fabrication assembly encapsulation device 2900 for use with the fabrication machine 1950. The materials for insulation encapsulation are supplied to the custom flat cable encapsulated profile fabrication assembly encapsulation device 2900 using encapsulation materials and curing process materials inlets 1960. In this example a custom flat cable element assembly mounting holes segmented block 2940 is assembled of individual segments predrilled to match the diameters of cable elements. Included with the predrilled segments are custom flat cable element assembly mounting hole segmented block indent spacer 2950 used to provide the space for indent elements in the insulation encapsulation process of one embodiment.

Figure 30A:
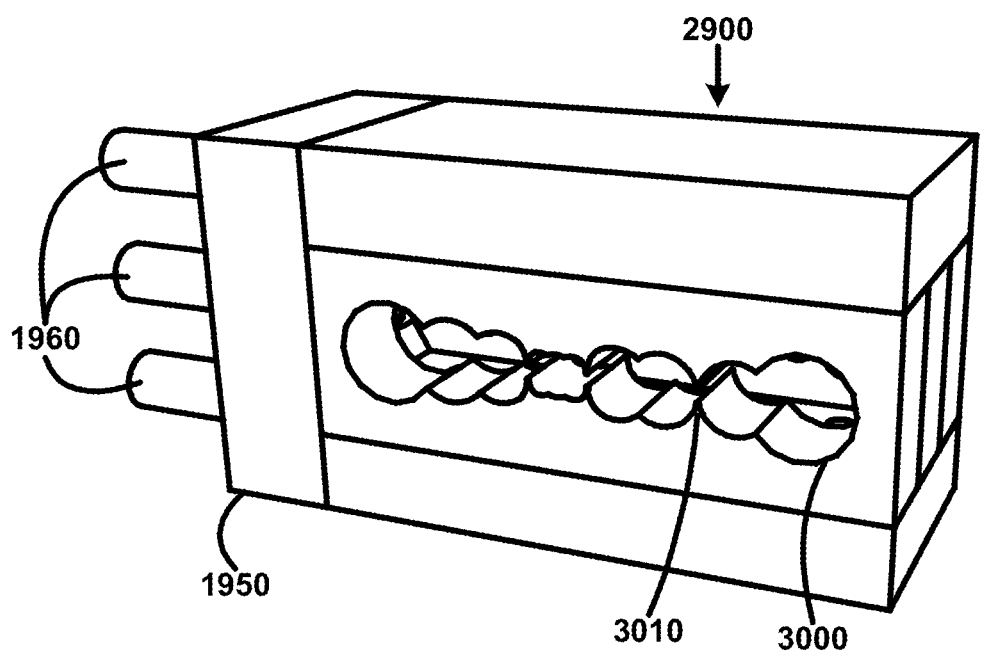
FIG. 30A shows for illustrative purposes only an example of custom flat cable element assembly mounting hole one piece extrusion key of one embodiment.

Custom Flat Cable Element Assembly One Piece Extrusion Key:

FIG. 30A shows for illustrative purposes only an example of custom flat cable element assembly one piece extrusion key of one embodiment. FIG. 30A shows the custom flat cable encapsulated profile fabrication assembly encapsulation device 2900 for use with the fabrication machine 1950. The materials for insulation encapsulation are supplied to the custom flat cable encapsulated profile fabrication assembly encapsulation device 2900 using encapsulation materials and curing process materials inlets 1960. In this example is shown a custom flat cable element assembly mounting hole one piece extrusion key 3000 and custom flat cable element assembly mounting hole one piece extrusion key indent section 3010. The size of the openings corresponds to an insulation thickness beyond the diameters of the cable elements and is used to form the shape of the encapsulated insulation application of one embodiment.

Figure 30B:
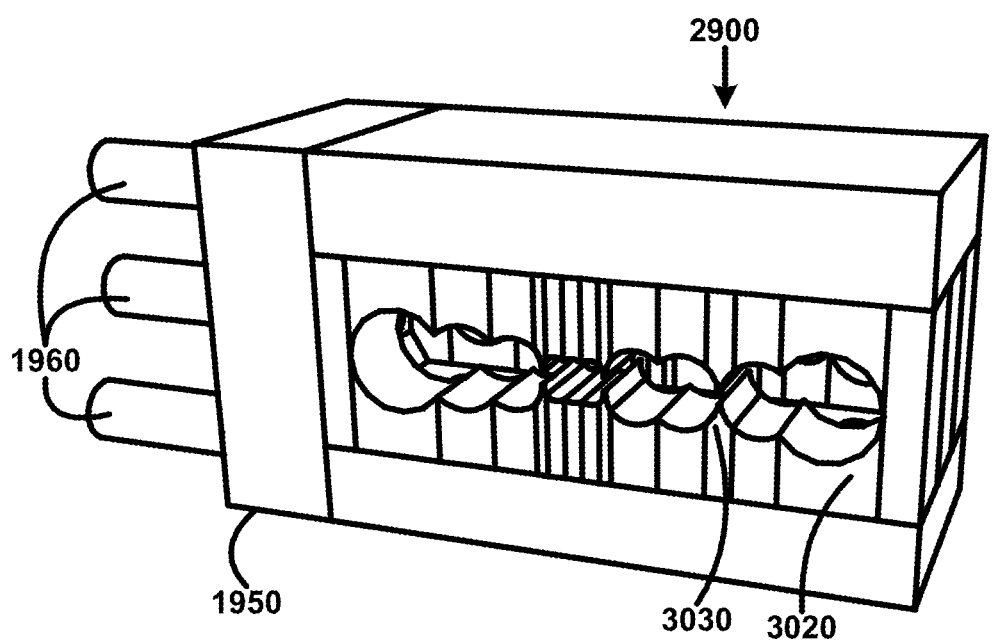
FIG. 30B shows for illustrative purposes only an example of custom flat cable element assembly mounting hole segmented extrusion key of one embodiment.

Custom Flat Cable Element Assembly Mounting Hole Segmented Extrusion Key:

FIG. 30B shows for illustrative purposes only an example of custom flat cable element assembly mounting hole segmented extrusion key of one embodiment. FIG. 30B shows the custom flat cable encapsulated profile fabrication assembly encapsulation device 2900 for use with the fabrication machine 1950. The materials for insulation encapsulation are supplied to the custom flat cable encapsulated profile fabrication assembly encapsulation device 2900 using encapsulation materials and curing process materials inlets 1960. In this example a custom flat cable element assembly mounting hole segmented extrusion key 3020 is used with one or more custom flat cable element assembly mounting hole segmented indent extrusion key 3030 to create an extrusion key through which encapsulation materials are extruded to form the insulation encapsulation corresponding to the custom flat cable design. The segmented extrusion key sections can be predrilled or cut to provide the insulation thickness predetermined for the custom flat cable design and assembled according to the design cable elements of one embodiment.

Figure 31:
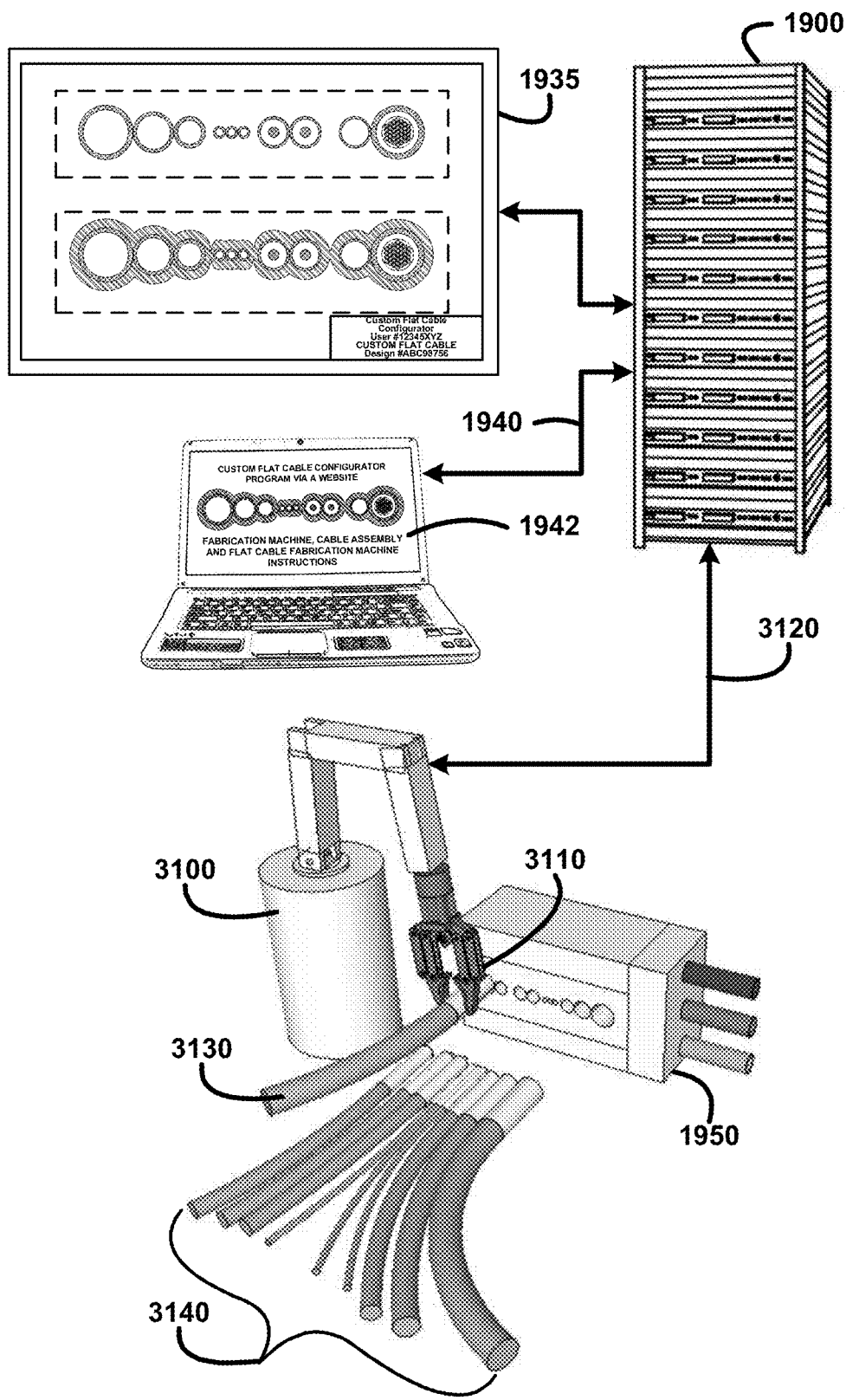
FIG. 31 shows for illustrative purposes only an example of fabrication robot element insertion device of one embodiment.

Fabrication Robot Element Insertion Device:

FIG. 31 shows for illustrative purposes only an example of fabrication robot element insertion device of one embodiment. FIG. 31 shows the at least one server 1900, at least one custom flat cable design drawing 1935 and the digital computer fabrication interface 1942. The digital computer fabrication interface 1942 transmits instructions to the at least one server transmitting and receiving fabrication data 1940 including fabrication robot element insertion device instructions 3120. The fabrication robot element insertion device instructions 3120 include signal to a robotic gripper to grasp a cable element being pulled from a roll 3130 and for the robotic gripper inserting cable element 3110 into the mounting hole corresponding to the cable element and custom flat cable design. Other cable elements pulled from a roll 3140 have been prepositioned for insertion by the robot gripper following instructions from the at least one server 1900 and digital computer fabrication interface 1942 of one embodiment.

Figure 32:
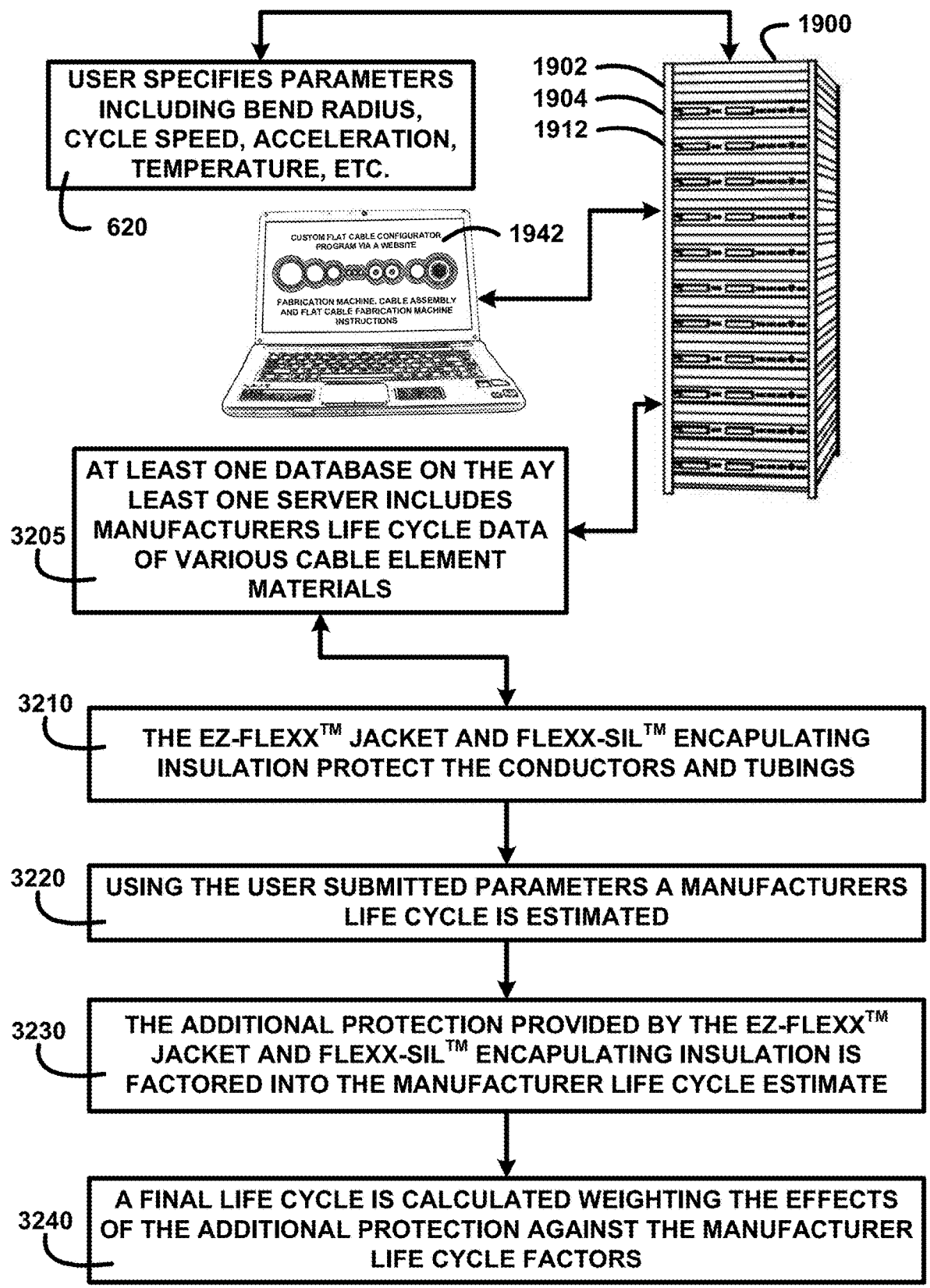
FIG. 32 shows for illustrative purposes only an example of a cable life calculator of one embodiment.

Cable Life Calculator:

FIG. 32 shows for illustrative purposes only an example of a cable life calculator of one embodiment. FIG. 32 shows the at least one server 1900, at least one digital database 1902, at least one digital processor 1904, a cable life calculator 1912 and digital computer fabrication interface 1942. During the user selection of cable elements a user specifies parameters including bend radius, cycle speed, acceleration, temperature, etc. 620 that affect a life cycle of a cable and are used for assessing those parameters impact on a cable life cycle. At least one digital database 1902 on the at least one server includes manufacturers life cycle data of various cable element materials 3205. Cable elements for selection by a user have been prepared using the EZ-Flexx™ jacket and Flexx-Sil™ encapsulating insulation protect the conductors and tubes 3210. Using the user submitted parameters a manufacturers life cycle is estimated 3220. The additional protection provided by the EZ-Flexx™ jacket and Flexx-Sil™ encapsulating insulation is factored into the manufacturer life cycle estimate 3230. The protection includes for example reducing the effect of extreme heat or cold which could accelerate the unprotected manufacturers' materials deterioration. A final life cycle is calculated weighting the effects of the additional protection against the manufacturer life cycle factors 3240 to arrive at an adjusted life cycle of one embodiment.

Figure 33:
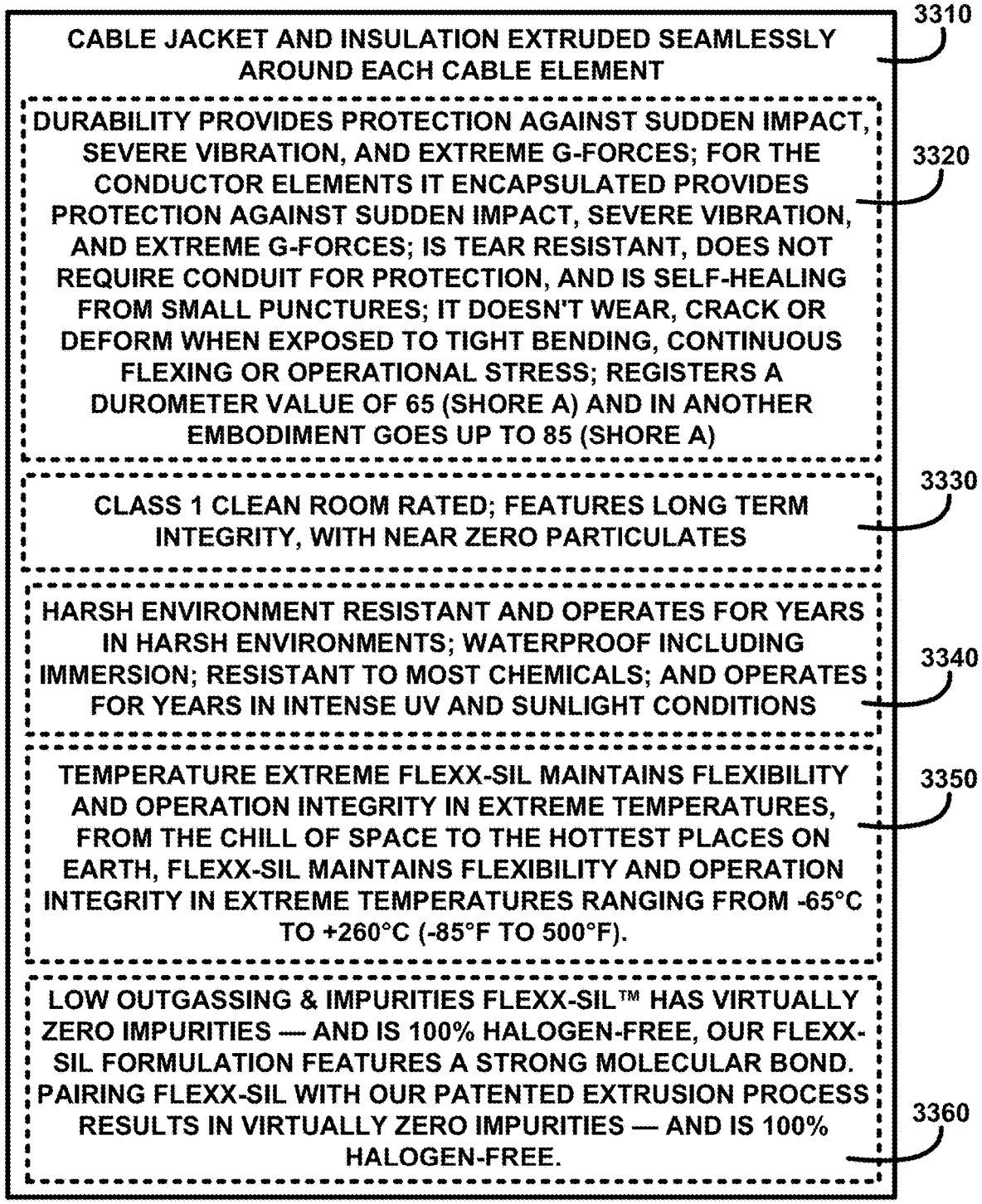
FIG. 33 shows a block diagram of an overview of jacket and encapsulating insulation additional protection of one embodiment.

Jacket and Encapsulating Insulation Additional Protection:

FIG. 33 shows a block diagram of an overview of jacket and encapsulating insulation additional protection of one embodiment. FIG. 33 shows a cable jacket and insulation extruded seamlessly around each cable element 3310. Durability provides protection against sudden impact, severe vibration, and extreme g-forces; for the conductor elements it encapsulated provides protection against sudden impact, severe vibration, and extreme g-forces; is tear resistant, does not require conduit for protection, and is self-healing from small punctures; it doesn't wear, crack or deform when exposed to tight bending, continuous flexing or operational stress; registers a durometer value of 65 (shore a) and in another embodiment goes up to 85 (shore a) 3320. The Durability of custom flat cable products make them desirable for heavy use applications including military applications including airplanes and jets, boats and ships, tanks and other vehicles including logistical operations where repeating machine operations puts stress on operating and monitoring cabling.

Custom flat cable products are class 1 clean room rated; features long term integrity, with near zero particulates 3330. The class 1 clean room rated status makes custom flat cable products desirable for medical application, space program applications, pharmaceutical and other high purity uses.

Harsh environment resistant and operates for years in harsh environments; waterproof including immersion; resistant to most chemicals; and operates for years in intense UV and sunlight conditions 3340. Temperature extreme Flexx-Sil™ maintains flexibility and operation integrity in extreme temperatures, from the chill of space to the hottest places on earth, Flexx-Sil™ maintains flexibility and operation integrity in extreme temperatures ranging from −65° C. to +260° C. (−85° F. to 500° F.) 3350. The hottest places on earth includes more than deserts for example steel mills, heavy production ceramic kilns, ship engine rooms, jet engine pods and other high temperature producing process locations.

Low outgassing & impurities Flexx-Sil™ has virtually zero impurities—and is 100% halogen-free, the Flexx-Sil™ formulation features a strong molecular bond. Pairing Flexx-Sil™ with the custom flat cable extrusion process results in virtually zero impurities—and is 100% halogen-free 3360 of one embodiment.

The foregoing has described the principles, embodiments and modes of operation of the present invention. However, the invention should not be construed as being limited to the particular embodiments discussed. The above described embodiments should be regarded as illustrative rather than restrictive, and it should be appreciated that variations may be made in those embodiments by workers skilled in the art without departing from the scope of the present invention as defined by the following claims.

The invention claimed is:

1. An apparatus, comprising:
a network;
at least one server;
an Internet website;
a custom flat cable configurator connected to the network, the at least one server, and the website;
wherein the custom flat cable configurator includes an interactive user interface on the Internet website which allows a user to custom design a flat cable assembly;
a user computer which connects to the custom flat cable configuration interactive user interface on the Internet website;
wherein the Internet website is configured for user selection of at least one cable element from the custom flat cable configurator user selectable cable elements to create a custom flat cable assembly design;
wherein the interactive user interface includes graphical drag and drop tools to allow addition, deletion and/or repositioning of the selected cable elements onto a designated area of the user interface while configuring the custom flat cable;
wherein the custom flat cable configurator includes a custom flat cable configurator cable life calculator to allow the user to specify parameters including bend radius, cycle speed, acceleration, and temperature factors that affect a life cycle of a cable;
wherein the custom flat cable configurator interactive user interface displays a user selected custom flat cable design in real time including cable thickness of insulation, conduit/tubing spacing and cable dimensions; and
wherein the interactive user interface is configured to allow the user to submit the custom flat cable design to be recorded on a digital memory storage device, receive via email a drawing of the custom flat cable design with a unique drawing identification number for printing on a user printer and subsequently place a purchase order with an email that includes the unique drawing identification number and receive a fabricated custom flat cable assembly shipped to the user.

2. The apparatus of claim 1, wherein the at least one server includes at least one digital database for manufacturers' life cycle data of various cable element materials.

3. The apparatus of claim 1, wherein the at least one server includes at least one CAD device for digitally drafting the custom flat cable design for printing.

4. The apparatus of claim 1, wherein the interactive user interface is configured to include an internet connection accessible using digital electronic devices including computers.

5. The apparatus of claim 1, wherein the interactive user interface is configured to include a wireless internet connection accessible using digital electronic devices including mobile devices including a laptop, tablet, and smart phones with a custom flat cable configurator program application installed.

6. The apparatus of claim 1, wherein the at least one drag and drop flat cable element configured to include power cable elements including 24 AWG, Single, Shielded; 24 AWG, Twisted Pair, Shielded; 22 AWG, Single, Unshielded; 22 AWG, Single, Shielded; 22 AWG, Twisted Pair, Unshielded; 22 AWG, Twisted Pair, Shielded; 20 AWG, Single, Shielded; 18 AWG, Single, Unshielded; 18 AWG, Single, Shielded; 18 AWG, Twisted Pair, Shielded; 16 AWG, Single, Shielded; 14 AWG, Single, Shielded; 12 AWG, Single, Shielded; and 10 AWG, Single, Shielded.

7. The apparatus of claim 1, wherein the at least one drag and drop flat cable element signal cable elements including 30 AWG, 100 Ohm Twinax; 28 AWG, Single, Unshielded; 28 AWG, Single, Shielded; 28 AWG, Twisted Pair, Unshielded; 28 AWG, Twisted Pair, Shielded; 28 AWG, 100 Ohm, Twinax; 28 AWG, Type J, Thermocouple; 28 AWG, Type K, Thermocouple; 28 AWG, 5 Twisted Pairs, Shielded; 26 AWG, Single, Shielded; 26 AWG, Twisted Pair, Shielded; 26 AWG, Twisted Tri, Shielded; and 24 AWG, 100 Ohm, Twinax.

8. The apparatus of claim 1, wherein the at least one drag and drop flat cable element video cable elements including 30 AWG, 75 Ohm, Coax; 30 AWG, 50 Ohm, Coax; and 100 Ohm Twinax (Camera Link).

9. The apparatus of claim 1, wherein the at least one drag and drop flat cable element tubing cable elements including 5/32" OD Tubing, Polyurethane; 1/4" OD Tubing, Polyurethane; 3/8" OD Tubing, Polyurethane; 5/32" OD Tubing, Teflon®; 1/4" OD Tubing, Teflon®; and 3/8" OD Tubing, Teflon®.

10. The apparatus of claim 1, wherein the at least one drag and drop flat cable element modules cable elements including Camera Link Signal Group; FireWire Signal Group; USB 2.0 Signal Group; USB 3.0 Signal Group; Cat5e Signal Group; Cat6 Signal Group and jacket elements cable elements including StripMount™ Embedded Fastening Strip; and Cable Indent For Dividing.

11. A method, comprising:
providing a network including at least one server with a connected custom flat cable configurator Internet website accessible via a user computer for allowing a user to custom design a flat cable assembly;
providing a custom flat cable configurator interactive user interface within an Internet website with interactive user selectable cable elements;
receiving, by a cable life calculator of the interactive user interface, user selections of custom cable assembly parameters, including bend radius, cycle speed, acceleration, and temperature factors that affect a cable life cycle;
receiving, by a graphical drag and drop tool of the interactive user interface, user selections of the selectable cable elements that allow addition, deletion and/or repositioning of the selected cable elements onto a designated area of the user interface while configuring the custom flat cable;
based on the user selections of the selectable cable elements, displaying, by the interactive user interface in real time, cable thickness of insulation, conduit/tubing spacing and cable dimensions on the user computer; and
wherein the user interface is configured to allow the user to make all final selections and submit a custom flat cable design via the Internet website and for the user to receive via email a drawing of the custom flat cable design with a unique drawing identification number for printing on a user printer and to place an order, purchase the user designed custom flat cable assembly via the Internet website so the custom flat cable assembly can be fabricated and shipped to the user.

12. The method of claim 11, wherein selectable cable elements include at least one element group, at least one element description, at least one element drawing symbol and an EZ-strip flat cable element.

13. The method of claim 11, wherein using the custom flat cable configurator interactive user interface includes a user selecting, editing and configuring cable elements using an internet connection including a wireless internet connections and interfacing using digital electronic devices including computers and mobile devices.

14. The method of claim 11, wherein using the custom flat cable configurator interactive user interface access custom flat cable configurator program application installed on mobile devices including a laptop, tablet, smart phones.

15. The method of claim 11, wherein the custom flat cable configurator interactive user interface displays a thickness of cable insulation, conduit/tubing spacing, cable assembly dimensions, cable life and a purchase price for the user selected custom cable.

16. An apparatus, comprising:
a network;
at least one server;
an Internet website;
a custom flat cable configurator connected to the network, the at least one server, and the website;
wherein the custom flat cable configurator includes an interactive user interface on the Internet website which allows a user to custom design a flat cable assembly;
a user computer which connects to the custom flat cable configuration interactive user interface on the Internet website;
wherein the custom flat cable configurator interactive user interface is used by the user for selecting at least one cable element from a plurality of user selectable cable elements;
wherein the custom flat cable configurator includes a custom flat cable configurator cable life calculator for allowing a user to specify custom parameters including bend radius, cycle speed, acceleration, and temperature of a cable assembly design for assessing those parameters effect on a cable life cycle;
wherein the user interface includes a graphical drag and drop tool to allow addition, deletion and/or repositioning of the selected cable elements onto a designated area of the user interface while configuring the custom flat cable;
wherein the interactive user interface is configured to display cable thickness of insulation, conduit/tubing spacing and cable dimensions in real time on the user computer;
wherein the user interface is configured to allow the user to make all final selections via the Internet website, submit a final custom flat cable design, receive a drawing with a unique identification number via email and subsequently to place an order, purchase the user designed custom flat cable assembly for fabrication via the Internet website; and
wherein the network at least one server transmits fabrication data to at least one fabrication computer coupled to at least one fabrication machine to activate the user custom flat cable design cable assembly and encapsulation to create the user custom flat cable product for shipping to the user.

17. The apparatus of claim 16, wherein the custom flat cable configurator is configured to include at least one element group, at least one element description, at least one element drawing symbol and an EZ-strip flat cable element.

18. The apparatus of claim 16, wherein the custom flat cable configurator is configured to include an internet connection accessible using digital electronic devices including computers.

19. The apparatus of claim 16, wherein the custom flat cable configurator is configured to include a wireless internet connection accessible using digital electronic devices including mobile devices including a laptop, tablet, smart phones with a custom flat cable configurator program application installed.

20. The apparatus of claim 16, wherein the custom flat cable configurator is configured for displaying a thickness of cable insulation, conduit/tubing spacing, cable assembly dimensions, cable life and a purchase price for the user selected custom cable.

\* \* \* \* \*